United States Patent
Yukawa et al.

(10) Patent No.: US 8,003,197 B2
(45) Date of Patent: Aug. 23, 2011

(54) RETROREFLECTIVE SHEET FOR SECURITY AND METHOD FOR MANUFACTURING THE SAME

(75) Inventors: Shigeo Yukawa, Wakayama (JP); Masanobu Tanaka, Kinokawa (JP)

(73) Assignee: Kiwa Chemical Industry Co., Ltd., Wakayama (JP)

( * ) Notice: Subject to any disclaimer, the term of this patent is extended or adjusted under 35 U.S.C. 154(b) by 1121 days.

(21) Appl. No.: 10/564,968

(22) PCT Filed: Nov. 12, 2004

(86) PCT No.: PCT/JP2004/016854
§ 371 (c)(1),
(2), (4) Date: Jan. 18, 2006

(87) PCT Pub. No.: WO2005/048217
PCT Pub. Date: May 26, 2005

(65) Prior Publication Data
US 2006/0188700 A1    Aug. 24, 2006

(30) Foreign Application Priority Data
Nov. 14, 2003  (JP) .................. 2003-386016

(51) Int. Cl.
*B32B 3/00*  (2006.01)
(52) U.S. Cl. .................. 428/195.1; 428/204
(58) Field of Classification Search ........... 428/195.1, 428/204
See application file for complete search history.

(56) References Cited

U.S. PATENT DOCUMENTS
4,663,213 A * 5/1987 Bailey et al. ............. 428/204
(Continued)

FOREIGN PATENT DOCUMENTS
EP    1 275 524    1/2003
(Continued)

OTHER PUBLICATIONS
Machine Translations of Abstract, Claims and Detailed Description of Kurz, JP2002-366036 (Dec. 20, 2002).

*Primary Examiner* — Betelhem Shewareged
*Assistant Examiner* — Sathavaram I Reddy
(74) *Attorney, Agent, or Firm* — Hamre, Schumann, Mueller & Larson, P.C.

(57) ABSTRACT

The present invention is directed to providing a retroreflective sheet for security that is difficult to be counterfeited, cannot be reused if once released, includes a printed image that can be identified visually regardless of an object to be attached such as a colored glass and also can be identified visually clearly even in the night time, and is directed to providing a method for manufacturing the same. The retroreflective sheet for security of the present invention includes: a surface layer 1; a binder layer 2; high-refractive-index glass beads 3; a print resin layer 4; a focusing layer 5; a metal layer 6; and a pressure-sensitive adhesive layer 7 in this order, wherein the print resin layer 4 forms a mark, the high-refractive-index glass beads 3 are disposed in the binder layer 2, a position for disposing the high-refractive-index glass beads 3 does not coincide with a position of the print resin layer 4, when being observed from the surface layer 1 side in a thickness direction of the retroreflective sheet for security, and the print resin layer 4 is made of a composition containing a room temperature curing resin as a main component.

20 Claims, 7 Drawing Sheets

U.S. PATENT DOCUMENTS

| | | | | |
|---|---|---|---|---|
| 5,069,964 | A * | 12/1991 | Tolliver et al. | 428/325 |
| 5,342,821 | A * | 8/1994 | Pearce | 503/227 |
| 5,714,223 | A * | 2/1998 | Araki et al. | 428/68 |
| 5,789,341 | A | 8/1998 | Furukawa | |
| 5,812,316 | A * | 9/1998 | Ochi et al. | 359/530 |
| 5,866,236 | A * | 2/1999 | Faykish et al. | 428/195.1 |
| 5,869,160 | A | 2/1999 | Mason et al. | |
| 6,066,594 | A | 5/2000 | Gunn et al. | |
| 6,165,442 | A | 12/2000 | Swaerd-Nordmo et al. | |
| 6,261,994 | B1 * | 7/2001 | Bourdelais et al. | 503/227 |
| 6,299,213 | B1 | 10/2001 | Souparis | |
| 7,504,147 | B2 * | 3/2009 | Hannington | 428/143 |
| 2002/0149658 | A1 * | 10/2002 | Furukawa | 347/101 |
| 2002/0155952 | A1 | 10/2002 | Furukawa | |
| 2003/0165668 | A1 | 9/2003 | Yukawa et al. | |
| 2005/0148469 | A1 * | 7/2005 | Yukawa et al. | 503/227 |
| 2005/0179253 | A1 * | 8/2005 | Rivera et al. | 283/81 |
| 2006/0029753 | A1 * | 2/2006 | Kuo et al. | 428/32.34 |

FOREIGN PATENT DOCUMENTS

| | | |
|---|---|---|
| EP | 1 302 330 | 4/2003 |
| EP | 1 415 798 | 5/2004 |
| EP | 1 504 918 | 2/2005 |
| JP | 54-39764 | 6/1978 |
| JP | 60-64302 | 4/1985 |
| JP | 61-40081 | 9/1986 |
| JP | 4-86701 | 3/1992 |
| JP | 9-277731 | 10/1997 |
| JP | 2000-192376 | 7/2000 |
| JP | 2000-206884 | 7/2000 |
| JP | 2002-14212 | 1/2002 |
| JP | 2002-67208 | 3/2002 |
| JP | 2002-79751 | 3/2002 |
| JP | 2002-366036 | 12/2002 |
| JP | 2003-231346 | 8/2003 |

* cited by examiner

RETROREFLECTIVE SHEET FOR SECURITY AND METHOD FOR MANUFACTURING THE SAME

TECHNICAL FIELD

The present invention relates to a retroreflective sheet for security and a method for manufacturing the same.

BACKGROUND ART

Conventionally, registered vehicles in every country in the world are provided with numbers that are unique to the respective vehicles, and each vehicle is provided with number plates including such a number on its front and back sides. However, since the number of stolen vehicles has increased recently, and the number plates of such stolen vehicles can be replaced by those of other vehicles, the detection of the stolen cars has become difficult. Moreover, the cases where only number plates are stolen for criminal purposes also are increasing.

In order to solve these problems, it has been proposed to attach a sticker having vehicle information and a counterfeit-preventing function to an inner surface of a window of the vehicle. As such a sticker that is attached to a transparent object from a back side thereof so as to be observed from a front side thereof, for example, a vehicle-identifying sticker including a print layer showing vehicle information such as text information and a bar code on a support, and a self-destructive layer containing a hologram and the like formed on an upper surface of the print layer, which cannot be tampered, is proposed (for example, see Patent Document 1). This vehicle-identifying sticker is provided with a pressure-sensitive adhesive layer on the self-destructive layer side, and is attached to an object via the pressure-sensitive adhesive layer. If the thus once-attached vehicle-identifying sticker is peeled off, the self-destructive layer is destroyed, and thus the vehicle-identifying sticker cannot be reused.

In addition, as such a sticker that is attached to a transparent object from a back side thereof so as to be observed from a front side thereof, for example, a hologram sticker to be attached from a back side, in which a transparent adhesive layer, a hologram layer and a light transmission suppressing layer are laminated, is known (for example, see Patent Document 2). This light transmission suppressing layer has a dark color, and suppresses transmission of visible light toward a back surface of the hologram layer so as to enhance the visual contrast of a hologram image. Accordingly, when being observed from the transparent adhesive layer side, which is attached to the object, the hologram layer easily can be identified visually with the light transmission suppressing layer in its background. In addition, as the light transmission suppressing layer, a plastic film and the like that are colored by a dye or a pigment as appropriate can be used.

However, in the vehicle-identifying sticker of Patent Document 1 that is attached to an object, a self-destructive layer, a print layer including text information or the like and a support layer are provided in this order, when being observed from the object. Accordingly, if the support layer is shaved off by any means while the sticker is attached, the print layer can be reached. Thus, there is a problem that, if the print layer is further shaved off, and the text information or the like is modified using a means such as an ink for marker pens, subsequently, another print layer is newly formed, and the sticker can be counterfeited from its back surface side without being released.

In addition, the vehicle-identifying sticker of Patent Document 1 also has a problem that, even if the print layer is formed on the self-destructive-type film in order to avoid the above-described problem, an authenticating pattern such as a hologram used as the self-destructive layer is shielded by the print layer and thus is difficult to identify when being observed from the object. Then, since it is difficult to distinguish a sticker having a print layer including counterfeited text information or the like from the vehicle-identifying sticker of Patent Document 1 when being observed from the object, the thus counterfeited sticker is likely to be used with ease.

In addition, in the hologram sticker to be attached from a back side of Patent Document 2 that is attached onto an object, a transparent adhesive layer, a hologram layer and a light transmission suppressing layer are provided in this order, when being observed from the object. Accordingly, Patent Document 2 does not refer to forming an image such as text information, and even if an image is formed, the image is difficult to identify, because the dark-colored light transmission suppressing layer lies in its background.

Objects to which the stickers according to Patent Documents 1 and 2 are attached include a colored glass like a shaded glass for vehicles, and glasses to which a colored heat ray-shielding film and a metal-evaporated film and the like are attached. However, there is a problem that, if the sticker attached to such an object is viewed from the object side, an image printed on the sticker cannot be identified clearly due to the glass, and identification of the authenticating pattern of the hologram layer is also difficult. In addition, even if the printed surface of the sticker attached to such a glass is irradiated with light from the object side, the glass and the like prevent transmission of the light, and thus identification of the image on the printed surface of the sticker is very difficult.

Another example of the decorated retroreflective sheet includes a retroreflective sheet in which plural transparent beads are embedded on a surface of a transparent fixing layer, and an optically-transparent portion including no transparent bead is provided for the fixing layer in part (for example, see Patent Document 3). A reflective layer may be provided directly on a rear surface of the transparent beads, or may not be provided, but in both cases, a part where no transparent bead is provided is the optically-transparent portion, which can transmit light. A method for manufacturing such a retroreflective sheet includes: printing a block line portion K on a surface of a temporary fixing layer firstly; embedding the transparent beads on the surface of the temporary fixing layer except the part of the block line portion K; forming a reflective layer on the transparent beads in the temporary fixing layer by vapor deposition subsequently; disposing the fixing layer so that a surface thereof can follow the surface of the temporary fixing layer; applying pressure onto them; and then releasing the temporary fixing layer from the fixing layer, thereby transferring the transparent beads to the fixing layer, so that the optically-transparent portion including no transparent bead may be provided for the fixing layer.

In Patent Document 3, since the reflective layer is not formed except on the transparent beads, even if a print layer, a hologram or the like showing vehicle information such as text information and a bar code is provided on a surface layer side, the optically-transparent portion exists, and thus visibility thereof is poor. Moreover, in the case where it is used as a retroreflective sheet, since the reflective layer is formed directly on the rear surface of the transparent beads, it is used as an exposed lens type or an encapsulated lens type, and an air layer is required to be provided above the transparent beads. Thus there is a problem if it is used as a sticker for security. Furthermore, since the manufacturing method includes: embedding the transparent beads in the temporary fixing layer temporarily; and then transferring the transparent beads to the fixing layer by applying pressure, manufacturing processes thereof are complicated. In addition, Patent Document 3 does not refer to a method for providing opacity to the part including no transparent bead. In particular, in the case of forming an image by using a sublimable dye, the air layer is expanded and bubbled by heat that is applied while forming the image, and accordingly, the appearance of the sheet deteriorates, or a film forming the air layer is broken, thus the method is not preferable.

Patent Document 1: JP 2002-366036 A
Patent Document 2: JP 2000-206884 A
Patent Document 3: JP 2002-14212 A

DISCLOSURE OF INVENTION

Problem to be Solved by the Invention

In light of the above-stated conventional problems, the present invention is directed to providing a retroreflective sheet for security, which is difficult to be counterfeited, cannot be reused if once released, includes a printed image that can be identified visually regardless of an object to be attached such as a colored glass, and also can be identified visually clearly even in the night time, and is directed to providing a method for manufacturing the same.

Means for Solving Problem

The retroreflective sheet for security of the present invention includes: a surface layer; a binder layer; high-refractive-index glass beads; a print resin layer; a focusing layer; a metal layer; and a pressure-sensitive adhesive layer in this order, wherein the print resin layer forms a mark, the high-refractive-index glass beads are disposed in the binder layer, a position for disposing the high-refractive-index glass beads does not coincide with a position of the print resin layer, when being observed from the surface layer side in a thickness direction of the retroreflective sheet for security, and the print resin layer is made of a composition containing a room temperature curing resin as a main component.

The image-added retroreflective sheet for security of the present invention includes:

a surface resin layer that has a weak affinity with a sublimable dye and allows the sublimable dye to penetrate;

a print layer that has an affinity with the sublimable dye and includes an image formed in a thickness direction of the layer by the sublimable dye;

a dye migration preventive resin layer for preventing migration of the sublimable dye;

a binder layer;

high-refractive-index glass beads;

a print resin layer;

a focusing layer;

a metal layer; and a pressure-sensitive adhesive layer in this order, wherein the print resin layer forms a mark, the high-refractive-index glass beads are disposed in the binder layer, a position for disposing the high-refractive-index glass beads does not coincide with a position of the print resin layer, when being observed from the surface resin layer side in a thickness direction of the image-added retroreflective sheet for security, and the print resin layer is made of a composition containing a room temperature curing resin as a main component.

Effects of the Invention

The retroreflective sheet for security of the present invention can enhance a counterfeit-preventing effect, because of having a specific configuration where the position of the print resin layer does not coincide with the position for disposing the high-refractive-index glass beads, which hardly can be obtained commercially. In addition, if the retroreflective sheet for security of the present invention is attached to an object and then released, a metal layer therein is destroyed, and thus the retroreflective sheet cannot be reused. Moreover, since the retroreflective sheet for security of the present invention includes the high-refractive-index glass beads and the like, a mark formed in the print resin layer can be identified visually clearly even in the night time.

DESCRIPTION OF THE INVENTION

Figure 1:
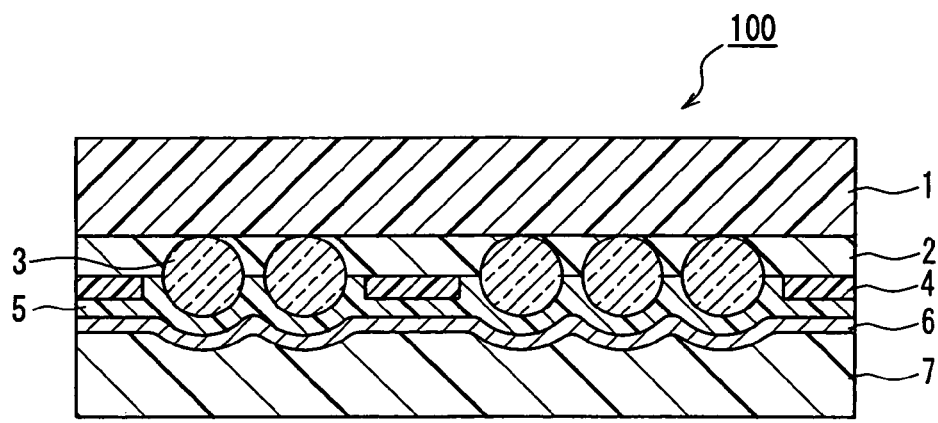
FIG. 1 is a cross-sectional view showing an example of the retroreflective sheet for security of the present invention.

The (image-added) retroreflective sheet for security of the present invention has a configuration where the position for disposing the high-refractive-index glass beads does not coincide with the position of the print resin layer, when being observed from the surface layer side in a thickness direction of the (image-added) retroreflective sheet for security of the present invention. Accordingly, when the (image-added) retroreflective sheet for security is viewed from the surface layer side, the print resin layer is not shielded by the glass beads, and the metal layer can be seen through. As a result, in the (image-added) retroreflective sheet for security of the present invention, the mark formed by the print resin layer can be recognized visually in a metallic tone.

In the retroreflective sheet for security of the present invention, the binder layer is preferably made of a composition containing a thermosetting resin. It is more preferably made of a thermosetting resin for which curing is suppressed at room temperature, and further preferably made of a composition containing a thermosetting resin for which curing does not proceed at room temperature. As a hardener used here, an amino resin, a block polyisocyanate resin or the like preferably is used. This is because, if the binder layer is made of such compositions, the curing of the binder layer can be suppressed when the print resin layer is cured at room temperature, and heat-sensitive-adhesion of the binder layer can be maintained sufficiently afterwards. Moreover, after disposing the glass beads, the binder layer can be cured by heating. Thus, the glass beads can be fixed in the binder layer sufficiently, and a crosslink can be formed between the focusing layer and the binder layer, so that interlayer adhesion between the focusing layer and the binder layer can be enhanced.

In the retroreflective sheet for security of the present invention, it is preferable that a self-destructive layer further is included between the focusing layer and the metal layer. Moreover, the self-destructive layer preferably is made of a resin composition having low adhesion with the metal layer. This is because, if the retroreflective sheet for security that is once attached to an object is released, the metal layer of the retroreflective sheet for security is destroyed, and thus the retroreflective sheet for security cannot be reused. Alternatively, in the retroreflective sheet for security of the present invention, it is preferable further to include the self-destructive layer, and to dispose the pressure-sensitive adhesive layer between the metal layer and the self-destructive layer. The self-destructive layer used here is preferably a film including a hologram or a diffraction grating, or a film obtained by subjecting a fragile film or a supporting film to a regular or irregular releasing treatment. Such films are preferable because, if the retroreflective sheet for security of the present invention is attached to an outer surface of an window glass of a vehicle or the like, when it is viewed from an inside of the window glass, the hologram or the diffraction grating can be identified visually, which facilitates judging whether it is counterfeited or not. Moreover, such films are preferable because, if the retroreflective sheet for security that is once attached to an object is released, the film or the like including the hologram or the diffraction grating of the retroreflective sheet for security is destroyed, and the retroreflective sheet for security cannot be reused.

In the retroreflective sheet for security of the present invention, the surface layer and the binder layer preferably are made of the same resin composition. It is preferable to form the surface layer and the binder layer of the same composition, because the surface layer and the binder layer can be manufactured as a single layer at one time, and the processing cost thereof accordingly can be reduced.

It is preferable that the retroreflective sheet for security of the present invention can be colored by allowing a sublimable dye to penetrate an inside of an image formation resin layer by heating, and the surface layer includes: a surface resin layer that has a weak affinity with the sublimable dye and allows the dye to penetrate; an image formation resin layer having an affinity with the dye; and a dye migration preventive resin layer for preventing migration of the dye, in this order from a surface side of the surface layer. This is because, if including the surface resin layer, the image formation resin layer and the dye migration preventive resin layer, the dye can be introduced from the surface resin layer side into the image formation resin layer, and can penetrate an inside of the image formation resin layer by being heated so that an image can be formed therein. As formed in the above-described manner, the image is formed in the image formation resin layer in a thickness direction of the layer. Accordingly, the image has a third dimension, and cannot be tampered by shaving off the print layer, whereby a counterfeit-preventing effect can be enhanced significantly.

In the retroreflective sheet for security of the present invention, the dye migration preventive resin layer is preferably a resin layer containing a vinyl resin with a glass transition temperature (Tg) of 70° C. or more and a SP value of 9.0 or more as a main component. Since the retroreflective sheet for security of the present invention includes such a dye migration preventive resin layer, the migration of the sublimable dye to the pressure-sensitive adhesive layer over the course of time, which causes the occurrence of a blurry edge and the like of the image and deterioration of sharpness of the image, can be prevented Thus, the image formed in the image formation resin layer of the retroreflective sheet for security of the present invention is stable over a long period of time. Moreover, by providing the dye migration preventive resin layer as mentioned above, a plasticizer or the like can be added to the binder layer of the retroreflective sheet for security so as to provide flexibility thereto. Thus, flexibility and stretchability of the retroreflective sheet for security, which are necessary for following along a three-dimensionally curved surface of the object when the retroreflective sheet for security is attached to the curved surface, can be obtained.

In the retroreflective sheet for security of the present invention, a film thickness of the dye migration preventive resin layer preferably ranges from 1 μm to 100 μm inclusive. This is because, if the film thickness is 1 μm or more, a dye migration-preventing effect can be exhibited sufficiently, and if the film thickness is 100 μm or less, stiffness can be prevented, which can facilitate the attachment of the retroreflective sheet for security to a substrate. The film thickness preferably ranges from 2 μm to 80 μm inclusive, and more preferably ranges from 3 μm to 60 μm inclusive.

Moreover, in the retroreflective sheet for security of the present invention, the dye migration preventive resin layer is preferably a biaxially stretched film that is stretched by 10% or more in a winding direction and in a width direction respectively. By using such a biaxially stretched film, the migration of the sublimable dye to the pressure-sensitive adhesive layer over the course of time, which causes the occurrence of a blurry edge and the like of the image and the deterioration of the sharpness of the image, can be prevented. Thus, the image formed in the image formation resin layer of the retroreflective sheet for security of the present invention is stable over a long period of time.

In the retroreflective sheet for security of the present invention, a shrinkage ratio of the biaxially stretched film in the winding direction of the film after being heated at 150° C. for 30 minutes is preferably 1.0% or less. This is because, by using the biaxially stretched film with such a low shrinkage ratio, wrinkles and streaks that occur during the heating can be suppressed.

In the retroreflective sheet for security of the present invention, the image formation resin layer is preferably a resin layer containing a low-molecular-weight compound with a molecular weight of 1300 or less in an amount of 0 wt % to 20 wt % inclusive. This is because, by decreasing the content of the low-molecular-weight compound, the migration of the dye from the image formation resin layer can be prevented.

The original sheet of the retroreflective sheet for security of the present invention is an original sheet for the retroreflective sheet for security of the present invention, including: a surface layer; a binder layer; high-refractive-index glass beads; a print resin layer; a focusing layer; and a metal layer in this order, wherein the print resin layer forms a mark, the high-refractive-index glass beads are disposed in the binder layer, a position for disposing the high-refractive-index glass beads does not coincide with a position of the print resin layer when being observed from the surface layer side in a thickness direction of the original sheet of the retroreflective sheet for security, and the print resin layer is made of a composition containing a room temperature curing resin as a main component.

The method for manufacturing the retroreflective sheet for security of the present invention includes: laminating the binder layer on the surface layer; printing on the binder layer so as to form the print resin layer; curing the print resin layer at room temperature; heating the binder layer to a temperature at which the binder layer generates stickiness; embedding the glass beads in a part of the binder layer where the print resin layer is not formed; laminating the focusing layer on the binder layer, the print resin layer and the high-refractive-index glass beads; forming the metal layer on the focusing layer; and forming the pressure-sensitive adhesive layer on the metal layer.

According to this manufacturing method, if the binding layer is heated to a temperature at which the binder layer generates the stickiness, the print resin layer does not generate stickiness, therefore, when the high-refractive-index glass beads are embedded in the binder layer, the high-refractive-index glass beads are not embedded in the part where the print resin layer is formed. Thus, when the retroreflective sheet for security is observed from the surface layer side, the part of the print resin layer is not shielded by the glass beads, and the metal layer can be seen through. As a result, in the retroreflective sheet for security of the present invention, the mark formed by the print resin layer can be visually recognized in a metallic tone.

It is preferable that the surface layer includes: a surface resin layer that has a weak affinity with a sublimable dye and allows the dye to penetrate; an image formation resin layer having an affinity with the sublimable dye; and a dye migration preventive resin layer for preventing migration of the sublimable dye in this order from a surface side of the surface layer, and the binder layer is laminated on the dye migration preventive resin layer. This is because, if the surface resin layer, the image formation resin layer and the dye migration preventive resin layer are included, the dye can be introduced from the surface resin layer side into the image formation resin layer, and can penetrate an inside of the image formation resin layer by being heated so that an image may be formed therein. As is formed in the above-mentioned manner, the image is formed in the image formation resin layer in the thickness direction of the layer. Accordingly, the image has a third dimension, and cannot be tampered by shaving off the print layer, whereby a counterfeit-preventing effect can be enhanced significantly.

As mentioned above, the image-added retroreflective sheet for security of the present invention includes: a surface resin layer that has a weak affinity with a sublimable dye and allows the dye to penetrate; the print layer that has an affinity with the sublimable dye and includes an image formed in a thickness direction of the layer by the dye; a dye migration preventive resin layer for preventing migration of the dye; a binder layer; high-refractive-index glass beads; a print resin layer; a focusing layer; a metal layer; and a pressure-sensitive adhesive layer in this order, wherein the print resin layer forms a mark, the high-refractive-index-glass beads are disposed in the binder layer, a position for disposing the high-refractive-index glass beads does not coincide with a position of the print resin layer when being observed from the surface resin layer side in a thickness direction of the image-added retroreflective sheet for security, and the print resin layer is made of a composition containing a room temperature curing resin as a main component. Since such an image-added retroreflective sheet for security includes the print layer in which the image is formed in the thickness direction of the layer by sublimating the sublimable dye with excellent transparency, the image has a third dimension, and cannot be tampered by shaving off the print layer, whereby a counterfeit-preventing effect can be enhanced significantly. It is preferable to further include a self-destructive layer between the focusing layer and the metal layer. Alternatively, it is preferable further to include a self-destructive layer, and to dispose the pressure-sensitive adhesive layer between the metal layer and the self-destructive layer. The surface resin layer, the dye migration preventive resin layer, the binder layer, the high-refractive-index glass beads, the print resin layer, the focusing layer, the metal layer, the pressure-sensitive adhesive layer and the self-destructive layer are preferably the same as those included in the retroreflective sheet for security. In addition, the resin of the print layer is preferably the same as that of the image formation resin layer of the retroreflective sheet for security.

A method for manufacturing the image-added retroreflective sheet for security of the present invention including: the surface resin layer; the print layer that has an affinity with the sublimable dye and includes an image formed in a thickness direction of the layer by the dye; the dye migration preventive resin layer; the binder layer; the high-refractive-index glass beads; the print resin layer; the focusing layer; the metal layer; and the pressure-sensitive adhesive layer in this order (hereinafter, the method will be called a first method for manufacturing the image-added retroreflective sheet for security of the present invention) includes: printing on a transfer paper by using an ink containing the sublimable dye; contacting an image-formed surface of the transfer paper with the surface resin layer of the retroreflective sheet for security of the present invention; heat-treating subsequently so as to sublimate the sublimable dye, allow the sublimable dye to penetrate the surface resin layer and form an image in the image formation resin layer for obtaining a print layer; and removing the transfer paper. The retroreflective sheet for security of the present invention used in the first method for manufacturing the image-added retroreflective sheet for security of the present invention includes: the surface resin layer; the image formation resin layer; the dye migration preventive resin layer; the binder layer; the high-refractive-index glass beads; the print resin layer; the focusing layer; the metal layer; and the pressure-sensitive adhesive layer in this order. Since the image is formed in the image formation resin layer by sublimating the sublimable dye for dying from the surface resin layer side according to this manufacturing method, not only text information but also a photo image of a vehicle and the like can be obtained as sharp images. Moreover, with the dye migration preventive resin layer, the migration of the sublimable dye to the pressure-sensitive adhesive layer over the course of time, which causes the occurrence of a blurry edge and the like of the image and the deterioration of the sharpness of the image, can be prevented.

A method for manufacturing the image-added retroreflective sheet for security of the present invention including: the surface resin layer; the print layer that has an affinity with the sublimable dye and includes an image formed in a thickness direction of the layer by the dye; the dye migration preventive resin layer; the binder layer; the high-refractive-index glass beads; the print resin layer; the focusing layer; the metal layer; and the pressure-sensitive adhesive layer in this order (hereinafter, the method will be called a second method for manufacturing the image-added retroreflective sheet for security of the present invention) includes: forming, on the surface resin layer of the retroreflective sheet for security of the present invention, a releasable ink receptive layer that can display by print, has absorption of the ink containing the dye on a surface side that is not contact with the surface resin layer, can be subjected to heat treatment for sublimating the dye and allowing the dye to penetrate the surface resin layer so as to form an image in the image formation resin layer, and can be released in a state of a film from the surface resin layer after the heat treatment; printing on the ink receptive layer by using the ink containing the sublimable dye; heat-treating subsequently so as to sublimate the sublimable dye, allow the sublimable dye to penetrate the surface resin layer and form an image in the image formation resin layer for obtaining a print layer; and releasing the releasable ink receptive layer. The retroreflective sheet for security of the present invention used in the second method for manufacturing the image-added retroreflective sheet for security of the present invention includes: the surface resin layer; the image formation resin layer; the dye migration preventive resin layer; the binder layer; the high-refractive-index glass beads; the print resin layer; the focusing layer; the metal layer; and the pressure-sensitive adhesive layer in this order. It is preferable to form an image in the image formation resin layer according to this method, because a step of printing the image on the ink receptive layer and a step of dyeing by sublimation can be automated, and thus the retroreflective sheet for security can be manufactured simply.

The retroreflective sheet for security of the present invention and the method for manufacturing the same will be described below in detail, by way of embodiments.

EMBODIMENT 1

FIG. 1 is a cross-sectional view showing an example of the retroreflective sheet for security of the present invention. A retroreflective sheet for security 100 includes a surface layer 1, a binder layer 2, high-refractive-index glass beads 3, a print resin layer 4, a focusing layer 5, a metal layer 6 and a pressure-sensitive adhesive layer 7 that are laminated in this order.

Materials for the surface layer 1 and the binder layer 2 will be described. Specifically, for example, a fluoroolefin copolymer having a reactive functional group, a polyester resin, an alkyd resin, a polyurethane resin, a vinyl resin, and an acrylic polymer having a reactive functional group as a base resin component with a hardener such as an amino resin, an epoxy resin, polyisocyanate and block polyisocyanate and/or a hardening catalyst added thereto can be used as the surface layer, and an amino resin that is not a room temperature curing type and a hardener such as block polyisocyanate that is not cured at room temperature can be used as a hardener for the binder layer. Each of the resin compositions exemplified as the materials for the surface layer 1 and the binder layer 2 may be used alone or as a mixture of two kinds or more. As forms of the resins used for the surface layer 1 and the binder layer 2, a solution type, a non-water-dispersion type, a water-soluble type and a water-dispersion type can be used, and a solution type is particularly preferable. The resin composition for forming the binder layer 2 having a higher molecular weight can reduce more tack occurring at room temperature, and thus is preferable. In addition, a dried film thickness of the binder layer 2 is set to be, for example, 10% to 90% of a particle diameter of the glass beads, preferably 20% to 80%, and further preferably 30% to 70%.

The surface layer 1 is formed by, for example, being applied on a polyester film as a processing film and being dried, and a binder layer further is laminated thereon. The surface layer 1 may have a multilayer structure including two or more layers as necessary. Moreover, it is also possible to structure the surface layer 1 and the binder layer 2 as one identical layer by forming the surface layer 1 and the binder layer 2 with the same composition. In this case, the resin for the binder layer is applied directly on the processing film and is dried so as to form the layer to obtain a thickness larger by a corresponding thickness of the surface layer. This processing film is released as necessary in the process of manufacturing the retroreflective sheet for security of the present invention or after the final step thereof.

Furthermore, a polyester resin film preferably is used as the surface layer 1, because the processing film used when manufacturing the surface layer 1 can also perform as the surface layer 1, and thus can be used directly as the surface layer 1. The surface layer 1 is preferably a stretched film, and more preferably a biaxially stretched film.

Moreover, as the material for the binder layer 2, a composition containing a thermosetting resin is more preferable. The binder layer 2 made of such a composition contains a thermosetting component in a system, but is preferably made of a composition containing a thermosetting resin of which curing is suppressed at room temperature, and is more preferably composed of a composition containing a thermosetting resin that does not cure at room temperature so that the binder layer 2 still may be in a thermoplastic state so as to sustain its heat-sensitive adhesion. Thereby, in an example of the method for manufacturing the retroreflective sheet for security of the present invention, the binder layer 2 can generate stickiness by heating. Furthermore, a resin composition that does not cause a blocking phenomenon between the binder layer 2 and a rear surface of the processing film that is used as a supporting film for manufacturing the surface layer 1 and the binder layer 2, when performing a blocking test with a load of 172 $gf/cm^2$ (1.687 $N/cm^2$) at room temperature for 10 days, is more preferable.

The high-refractive-index glass beads 3 have a refractive index of, for example, 2.00 to 2.40, and preferably 2.10 to 2.30. The refractive index of 2.0 or more does not require a thickness of the focusing layer to be excessively large, and thus facilitates forming a resin concentrically with a spherical diameter of the glass beads at a heating temperature for forming the focusing layer. In addition, the refractive index of 2.4 or less can prevent crystallization of the glass beads with such a refractive index, and facilitates producing the transparent glass beads industrially with high precision. Moreover, the particle diameter thereof ranges, for example, from 5 μm to 300 μm, and preferably ranges from 20 μm to 100 μm. The particle diameter of the glass beads of 5 μm or more does not require the film thickness of the focusing layer to be excessively small, and can control the film thickness thereof. The particle diameter of the glass beads of 300 μm or less does not require the film thickness of the focusing layer to be excessively large, and thus facilitates forming the resin concentrically with the spherical diameter of the glass beads at the heating temperature for forming the focusing layer.

The print resin layer 4 is made of a composition containing a room temperature curing resin as a main component. In an example of the method for manufacturing the retroreflective sheet for security of the present invention, the print resin layer 4 made of such a composition is required to volatilize a solvent thereof after being formed, and to be wound once so as to be cured at room temperature. Herein, the print resin layer 4 is preferably tack-free. This is because, if the curing of the print resin layer 4 proceeds in such a wound state at room temperature, when the binder layer 2 is heated so as to generate stickiness, the generation of the stickiness can be suppressed. Examples of the material for the print resin layer 4 include a composition that can be cured three-dimensionally at room temperature by a reaction between: a resin such as an alkyd resin, a polyester resin, an epoxy resin, an urea resin, a silicone resin, an acrylic silicone resin, an urethane resin, a vinyl resin and an acrylic resin; and a hardener that react at room temperature with a reactive functional group introduced in the above-described resin and/or a hardening catalyst.

The focusing layer 5 is made of, for example, a composition containing a polyurethane resin, a polyvinyl acetal resin, an acrylic resin, an alkyd resin, a polyester resin or the like as a base polymer component. These compositions can be used as non-crosslinking types, or may be used as thermosetting types by blending a hardener such as an amino resin, an epoxy resin, polyisocyanate and block polyisocyanate.

The metal layer 6 can be made of a metal, for example, aluminum, gold, silver, copper, nickel, chrome, magnesium and zinc, and among them, aluminum, chrome or nickel is preferable in terms of the processability, the ease of forming the metal layer, the reflection efficiency of light, the durability and the like. In addition, the metal layer 6 also may be made of an alloy containing metals of two kinds or more. The thickness of the metal layer 6 varies according to the metal used, but it ranges, for example, from 5 nm to 200 nm, and preferably ranges from 10 nm to 100 nm. The thickness of the above-described metal layer 6 of 5 nm or more has a sufficient opacifying property, and can perform as a reflective layer sufficiently. On the other hand, the thickness of the metal layer 6 of 200 nm or less hardly generates a crack, and can reduce cost. Thus, such a thickness is preferable.

The pressure-sensitive adhesive layer 7 can be manufactured using a general pressure-sensitive adhesive. The thickness thereof is not limited particularly.

As the pressure-sensitive adhesive, acrylic pressure-sensitive adhesives including an acrylic ester copolymer, silicone pressure-sensitive adhesives including a silicone rubber and a silicone resin, and rubber-based pressure-sensitive adhesives including a natural rubber and a synthetic resin can be applied. The rubber-based pressure-sensitive adhesive contains three components: a natural rubber, a synthetic rubber or a reclaimed rubber as a main component; a tackifier; and an antioxidant, to which various materials such as a softener, a crosslinking agent and a filler can be selected to be added as necessary. As the acrylic pressure-sensitive adhesive, a solvent type, an emulsion type, a water-based type that is a water-soluble type, a hot-melt type and a solventless type that is a liquid-curable type can be used. Among them, the solvent type is preferable because it has excellent weather-resistance and heat-aging-resistance, and can maintain permanent adhesion with long-term reliablity or a rereleasable function. It is more preferable to use a base polymer that incorporates a monomer having a functional group for enhancing heat-resistance, solvent-resistance and plasticizer-migration-resistance, with a crosslinking agent that reacts with the functional group. Examples of the acrylic monomer having a functional group include hydroxyethyl acrylate, hydroxyethyl methacrylate, hydroxypropyl methacrylate, acrylic acid, methacrylic acid, itaconic acid, maleic anhydride, glycidyl acrylate, glycidyl methacrylate, N-methylolacrylamide, N-methylolmethacrylamide, dimethylaminoethyl methacrylate and t-butylaminoethyl methacrylate, and examples of the crosslinking agent include a melamine resin, an urea resin, polyisocyanate, an epoxy resin, a metal chelate, a —COOH-containing polymer, an acid anhydride and polyamine, but when the sublimable dye penetrates the image formation resin layer by heating, suitable thermal-discoloration-resistance is required. In addition, for suppressing the generation of a toxic material such as formaldehyde and an irritant component during the heating, a hardener such as an epoxy resin, a metal chelate and an aliphatic polyisocyanate more preferably is applied. Moreover, a tackifier may be used as necessary for the purpose of adding adherability to an adhesive at a low temperature or polyolefin. Furthermore, the silicone pressure-sensitive adhesive preferably is applied in the case where heat-resistance or low-temperature-resistance is required particularly.

Figure 13:
FIG. 13 is a view showing another example of the retroreflective sheet for security of the present invention, in which an image is formed.

As the mark included in the retroreflective sheet for security, a number plate, an issue date, a national flag (a public emblem such as a prefecture emblem and a state emblem), a photo image of a vehicle, vehicle information such as a bar code corresponding to a part or all of the above-described vehicle information, individual information such as ownership and a symbol mark printed faintly on the retroreflective sheet for security all over the face are exemplified (see FIG. 13). By printing these images in combination, the counterfeit-preventing function of the retroreflective sheet for security of the present invention can be enhanced further.

In addition, in the case where a higher function of security is required, an IC unit in which a larger amount of information can be input can be used. In this case, the IC unit may be laminated on a surface of the below-described surface resin layer 11 via a pressure-sensitive adhesive layer or an adhesive layer. Moreover, it is more preferable to attach a fragile film further on the IC unit via a pressure-sensitive adhesive layer or an adhesive layer, because the IC unit cannot be reattached, which further enhances the counterfeit-preventing function. Furthermore, it is preferable to reserve a space for attaching the IC unit on the surface resin layer 11, and not to form an image in a part of the below-described image formation resin layer 12 under the thus reserved space. This is because, if an image is formed in the part of the image formation resin layer 12 under the space where the IC unit is attached, the sublimable dye penetrates the surface resin layer 11 over the course of time and migrates into the pressure-sensitive adhesive layer of the IC unit, which may cause the occurrence of a blurry edge of the image and deterioration of sharpness of the image.

The IC unit is, for example, a non-contact-type and proximity-type IC unit, and is preferbly provided with a CPU: a central processing unit, a RAM: a high-speed memory for general data, a ROM: a read-only memory for storing programs, an EEPROM: a read-only memory used for storing data, an interface: a means of controlling communication between an IC card and an outside, a co-processor: a processor specifically for executing data of a RSA at a high speed, and an antenna coil for connecting them.

EMBODIMENT 2

Figure 2:
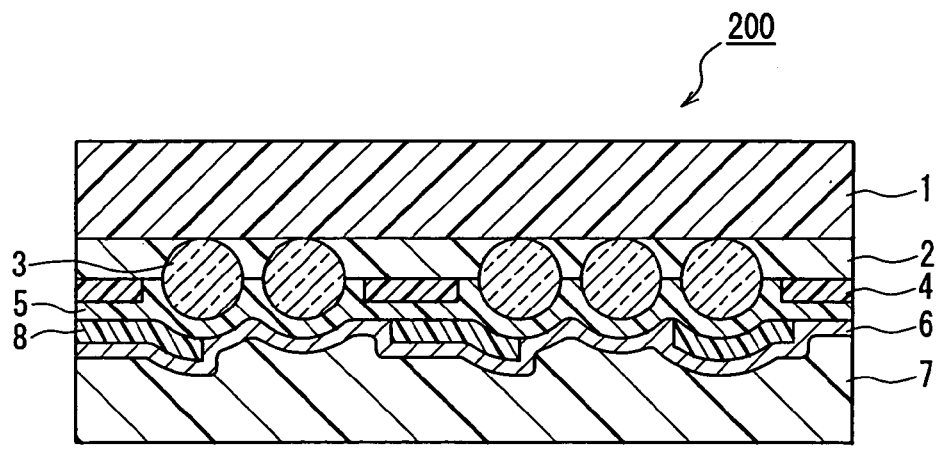
FIG. 2 is a cross-sectional view showing another example of the retroreflective sheet for security of the present invention.

FIG. 2 is a cross-sectional view showing another example of the retroreflective sheet for security of the present invention. A retroreflective sheet for security 200 includes a surface layer 1, a binder layer 2, high-refractive-index glass beads 3, a print resin layer 4, a focusing layer 5, a self-destructive layer 8, a metal layer 6 and a pressure-sensitive adhesive layer 7 that are laminated in this order.

The surface layer 1, the binder layer 2, the high-refractive-index glass beads 3, the print resin layer 4, the focusing layer 5, the metal layer 6 and the pressure-sensitive adhesive layer 7 are as described above in Embodiment 1.

The self-destructive layer 8 preferably is formed by using a resin composition that has low adhesion with the metal layer 6. Examples of this resin composition include a composition containing a silicone resin, a fluororesin, an alkyd resin, an acrylic resin, a cellulose resin or the like as a base polymer component. The self-destructive layer 8 may have a regular or irregular pattern.

EMBODIMENT 3

Figure 3:
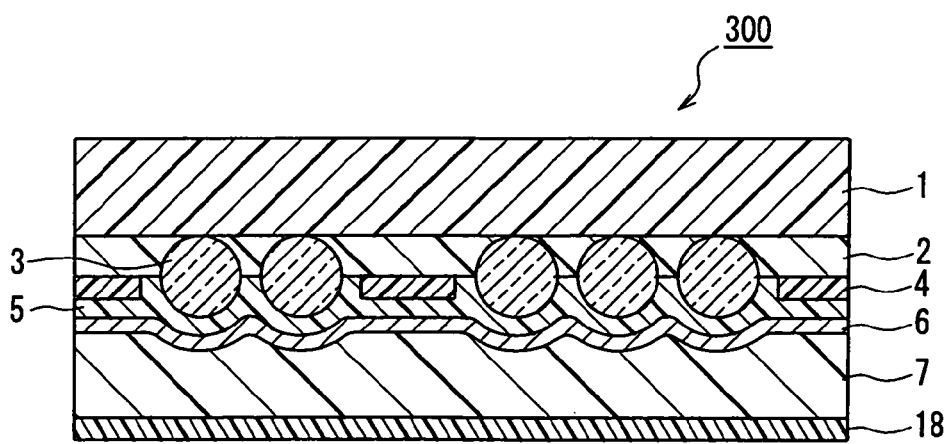
FIG. 3 is a cross-sectional view showing another example of the retroreflective sheet for security of the present invention.

FIG. 3 is a cross-sectional view showing another example of the retroreflective sheet for security of the present invention. A retroreflective sheet for security 300 includes a surface layer 1, a binder layer 2, high-refractive-index glass beads 3, a print resin layer 4, a focusing layer 5, a metal layer 6, a pressure-sensitive adhesive layer 7 and a self-destructive layer 18 that are laminated in this order.

The surface layer 1, the binder layer 2, the high-refractive-index glass beads 3, the print resin layer 4, the focusing layer 5, the metal layer 6 and the pressure-sensitive adhesive layer 7 are as described above in Embodiment 1.

As mentioned above, the self-destructive layer 18 is preferably a film that includes a hologram or a diffraction grating having a predetermined pattern arbitrarily, a self-destructive film obtained by subjecting a fragile film or a supporting film to a regular or irregular releasing treatment, or the like.

In this case, so that the retroreflective sheet for security can be attached to a window glass of a vehicle or the like, a pressure-sensitive adhesive layer may be formed on the self-destructive layer in the same manner as Embodiment 1 by, for example, attaching a pressure-sensitive adhesive layer that is formed separately on a releasing film onto the self-destructive layer so that they may face each other.

As the hologram, either a planar hologram or a volume hologram may be used. In the case of using the planer hologram, a relief hologram is preferable in the light of mass-production, durability and cost, and in the case of using the volume hologram, a Lippmann hologram is preferable in the light of image reproducibility and mass-production. Besides them, laser reproduction holograms such as a Fresnel hologram, a Fraunhofer hologram, a lensless Fourier-transform hologram and an image hologram, a white light reproduction hologram such as a rainbow hologram, a color hologram, a computer hologram, a hologram display, a multiplex hologram and a holographic stereogram to which mechanisms of the laser reproduction hologram and the white light reproduction hologram are applied can be used.

In addition, as the diffraction grating, a holographic diffraction grating, a diffraction grating that is formed mechanically with an electron beam painting apparatus or the like can be used.

Examples of a resin for forming the fragile film include: thermoplastic resins with a relatively low degree of polymerization of polyvinyl alcohol, an acrylic resin, polystyrene, polyvinyl chloride, a nitrocellulose resin, an acetyl cellulose resin, a cellulose acetate butyrate resin, and a vinyl chloride-vinyl acetate copolymer; transparent ultraviolet curable polymer resins of these resin complex systems; transparent electron beam curable polymer resins of these resin complex systems; transparent thermosetting polymer resins with a low degree of polymerization of unsaturated polyester, urethane and epoxy; ultraviolet curable monomer resins of these resin complex systems; electron beam curable monomer resins of these resin complex systems; a polyester or urethane thermosetting monomer resin; a silicone resin; a paraffin wax; and transparent varnishes based on drying oils such as a linseed oil. Examples of the supporting film include a polyester film, a polycarbonate film, an acrylic resin film and a cellulose resin film.

Examples of a releasing treatment agent include a silicone resin, a fluororesin, an acrylic resin, an alkyd resin, a chlorinated rubber-based resin, a vinyl chloride-vinyl acetate copolymer, a cellulose resin, a chlorinated polypropylene resin, and these resins with oil silicone, aliphatic acid amide, zinc stearate or the like added thereto. Moreover, inorganic materials also may be used.

EMBODIMENT 4

Figure 4:
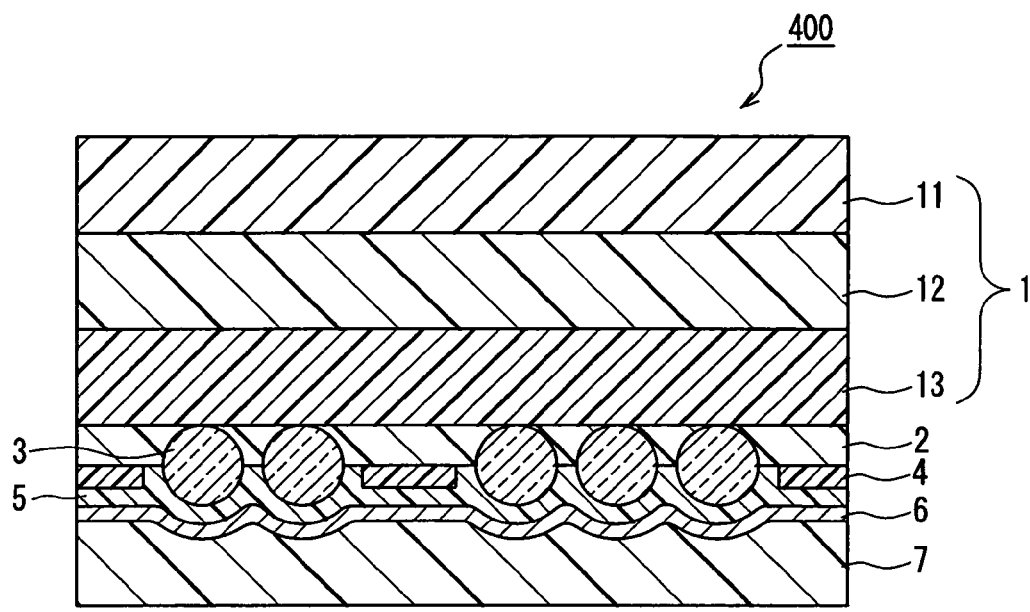
FIG. 4 is a cross-sectional view showing another example of the retroreflective sheet for security of the present invention.

FIG. 4 is a cross-sectional view showing another example of the retroreflective sheet for security of the present invention. A retroreflective sheet for security 400 includes a surface layer 1, a binder layer 2, high-refractive-index glass beads 3, a print resin layer 4, a focusing layer 5, a metal layer 6 and a pressure-sensitive adhesive layer 7 that are laminated in this order. The surface layer 1 includes a surface resin layer 11, an image formation resin layer 12 and a dye migration preventive resin layer 13 that are laminated in this order.

The binder layer 2, the high-refractive-index glass beads 3, the print resin layer 4, the focusing layer 5, the metal layer 6 and the pressure-sensitive adhesive layer 7 are as described above in Embodiment 1.

As mentioned above, the surface resin layer 11 preferably has a weak affinity with the sublimable dye, and allows the dye to penetrate. Examples of a material for such a surface resin layer 11 include olefin resins, i.e., polyethylene, polypropylene and the like, vinyl alcohol resins, i.e., polyvinyl alcohol and an ethylene-vinyl alcohol copolymer resin and the like, a fluororesin, a silicon resin and a mixture of them. Among them, as the material for the surface resin layer 11, a synthetic resin that contains a fluororesin or a silicon denatured acrylic resin as a main component is preferable. This is because they have high ultraviolet-resistance and a high non-affinity with the dye.

The surface resin layer 11 arbitrarily may include an additive and the like. In addition, a dried film thickness of the surface resin layer 11 ranges, for example, from about 1 μm to about 80 µm, preferably ranges from about 2 µm to about 60 µm, and more preferably ranges from about 3 µm to about 40 µm.

Examples of the synthetic resin containing the fluororesin as a main component include: fluoroolefin copolymers such as tetrafluoroethylene-perfluoroalkylvinylether copolymer, tetrafluoroethylene-hexafluoropropylene copolymer, tetrafluoroethylene-hexafluoropropylene-perfluoroalkylvinylether copolymer, tetrafluoroethylene-ethylene copolymer and chlorotrifluoroethylene-ethylene copolymer; and fluororesins such as polychlorotrifluoroethylene, polytetrafluoroethylene, polyvinylidene fluoride and polyvinyl fluoride.

The surface resin layer is manufactured using the synthetic resin containing the fluororesin as a main component preferably by, for example, a method of forming a fluororesin made of a fluoroolefin copolymer into a film by a processing method such as a solvent casting method (a casting method) or the like. A more preferable method is forming it into a film by a reaction of a fluoroolefin copolymer that is soluble in a solvent having a reactive functional group with a hardener that react with this reactive-functional group and/or a catalytic hardener.

Specific examples of the synthetic resin containing the silicon denatured acrylic resin as a main component will be described below:
(1) a cured film obtained by adding a hydrolytic catalyst to a vinyl copolymer that is obtained by copolymerizing vinyl monomers having hydrolyzable silyl groups;
(2) a cured film obtained by adding a compound having both an epoxy group and a hydrolyzable silyl group in one molecule to a vinyl copolymer that is obtained by copolymerizing vinyl monomers having amino groups and/or carboxyl groups;
(3) a cured film obtained by adding a polyisocyanate compound to a vinyl copolymer having a hydroxyl group that is obtained by graft-polymerizing a silicon resin; and
(4) a cured film obtained by adding a hydrolytic catalyst to a vinyl copolymer having a hydrolyzable silyl group that is obtained by graft-polymerizing a silicon resin.

In addition, since the surface resin layer 11 is an outermost layer of the retroreflective sheet for security of the present invention, and is positioned on an outer side of the print layer, it can protect the dye for forming the image in the print layer from ultraviolet rays, glass cleaner, water and the like, thus enhancing the durability.

Examples of additives contained in the surface resin layer 11, the image formation resin layer 12 and the dye migration preventive resin layer 13 include an ultraviolet absorber, a light stabilizer, and an antioxidant. They may be used alone or in combination of two kinds or more. By containing these additives, the durability of the surface resin layer 11, the image formation resin layer 12 and the dye migration preventive resin layer 13 can be enhanced more.

As the ultraviolet absorber, known ultraviolet absorbers can be used, for example, benzophenone, benzotriazole, cyanoacrylate, salicylate and anilide oxalate and the like can be used. As the light stabilizer, known light stabilizers can be used, for example, a hindered amine compound and the like can be used. As the antioxidant, for example, a hindered phenol compound, an amine antioxidant, a sulfur antioxidant and the like can be used.

In addition, the additives contained in the surface resin layer 11, the image formation resin layer 12 and the dye migration preventive resin layer 13 preferably have high-molecular weights. The use of the additives such as the ultraviolet absorber, the light stabilizer and the antioxidant with high-molecular weights can suppress problems such as the occurrence of phase caused by phase separation from the surface resin layer, bleed-out and a phenomenon of volatilizing the additive from the surface resin layer side during the heat treatment performed.

Moreover, as mentioned above, the image formation resin layer 12 is preferably a layer that has an affinity with the sublimable dye and can include the image formed in the thickness direction of the layer by the sublimable dye.

As a material for the image formation resin layer 12, a synthetic resin that has an affinity with the sublimable dye preferably is used. This is because, such a synthetic resin can efficiently capture the sublimable dye that is sublimated and diffused so as to color in a high concentration. As the material for the image formation resin layer 12, a resin with heat-resistance more preferably is used. This is because such a resin is not softened considerably nor generates tack (so-called stickiness) at a heating temperature of about 150° C. to about 200° C. during the sublimation dyeing. As the material for the image formation resin layer 12, a resin that can be cured with radiation is further preferably used. The effective forms of the radiation include electron beams, ultraviolet rays, nuclear radiation, microwave radiation and heat, and materials that can be cured with the radiation are known in the pertinent art.

The image formation resin layer 12 is preferably a layer containing a low-molecular-weight compound that has a molecular weight of 1300 or less, preferably has a molecular weight of 2000 or less, and more preferably has a molecular weight of 3000 or less, in an amount of 0% to 20 wt % inclusive. This is because the low-molecular-weight compound gradually can diffuse the once-fixed sublimable dye, and as a result, a problem occurs such as the deterioration of the sharpness of an edge of the image in the image formation resin layer 12. In addition, the content of the low-molecular-weight compound in the image formation resin layer 12 ranges from 0 wt % to 20 wt % inclusive, preferably ranges from 0 wt % to 15 wt % inclusive, and more preferably ranges from 0 wt % to 10 wt % inclusive.

In the image formation resin layer 12, an additive such as a plasticizer and the like can be contained, but the content thereof is preferably low. The additive gradually diffuses the once-fixed sublimable dye, and as a result, a problem occurs such as the deterioration of the sharpness of an edge of the image in the image formation resin layer 12.

In terms of the protection of the sublimable dye from ultraviolet rays and the like, an ultraviolet absorber that can filter out 70% or more, preferably 80% or more, and more preferably 90% or more of ultraviolet rays preferably is dispersed uniformly and included in the image formation resin layer 12. Specifically, as a material for the image formation resin layer 12 satisfying such required properties, synthetic resins such as an acrylic resin, an alkyd resin, a polyester resin, an urethane resin and an epoxy resin can be used.

A dried film thickness of the image formation resin layer 12 ranges, for example, from about 3 µm to about 100 µm, preferably ranges from about 5 µm to about 80 µm, and more preferably ranges from about 10 µm to about 60 µm.

The dye migration preventive layer 13 is preferably a resin layer containing a vinyl resin with a glass transition temperature (Tg) of 70° C. or more and a SP value (Solubility Parameter) of 9.0 or more as a main component, as mentioned above. This is because such a resin layer can prevent the migration of the dye. The dye migration preventive layer 13 preferably is made of a resin containing an acrylic resin as a main component, in particular.

The Tg value is preferably 80° C. or more, and more preferably 90° C. or more. If the Tg value is 70° C. or more, the migration of the sublimable dye can be prevented sufficiently, even at a high temperature such as in midsummer direct sun.

The SP value is preferably 9.25 or more, and more preferably 9.50 or more. The SP value mentioned here is a parameter indicating a polarity of a resin, and a higher SP value indicates a higher polarity of the resin.

The SP value can be measured by a method described below. In the case where the acrylic resin is an acrylic copolymer, the SP value thereof can be estimated by measuring a SP value of a homopolymer of the used acrylic monomer in advance. That is, the SP value of the acrylic copolymer can be estimated from the sum of the values obtained by multiplying the weight fractions of the individual acrylic monomers constituting the copolymer with the SP values of the homopolymers.

For example, actual measurements of SP values of homopolymers of acrylic monomers are as follows: a homopolymer of methyl methacrylate=10.6, a homopolymer of n-butyl methacrylate=8.4, a homopolymer of ethyl methacrylate=9.5, a homopolymer of β-hydroxyethyl methacrylate=11.5, a homopolymer of n-butyl acrylate=8.6.

From the above-described measurement values, a SP value of an acrylic copolymer, for example, a copolymer that contains methyl methacrylate/n-butyl acrylate/β-hydroxyethyl methacrylate=50/40/10 (by a weight ratio) can be estimated to be $(10.6\times0.5)+(8.6\times0.4)+(11.5\times0.1)=9.89$. The estimated SP value of this copolymer of 9.89 is close to the value of 9.92 obtained by the actual measurement that is performed by the following method.

A method for measuring SP values of acrylic resins is as follows:

A resin with a solid content of 0.5 g is weighed in a 100 ml Mayer flask, and 10 ml of tetrahydrofuran (THF) is added thereto so that the resin may be dissolved. The thus obtained solution is kept at a liquid temperature of 25° C., and hexane is dropped using a 50 ml buret while stirring with a magnetic stirrer. Then, the dropped amount ($V_h$) is determined at the time the solution generates turbidity (a turbid point). Next, a dropped amount ($V_d$) is determined separately at a turbid point when deionized water is used instead of hexane.

From the obtained $V_h$ and $V_d$, the SP value δ of the resin can be obtained using the formula given by UH, CLARKE [J. Polym. Sci. A-1, Vol. 5, 1671-1681(1967)] as follows:

$$\delta=[(V_{mh})^{(1/2)}\delta_{mh}+(V_{md})^{(1/2)}\delta_{md}]/[(V_{mh})^{(1/2)}+(V_{md})^{(1/2)}]$$

where $V_{mh}=(V_h\cdot V_t)/(\phi_h\cdot V_t+\phi_t\cdot V_h)$, $V_{md}=(V_d\cdot V_t)/(\phi_d\cdot V_t+\phi_t\cdot V_d)$, $\delta_{mh}=\phi_h\cdot\delta_h+\phi_t\cdot\delta_t$, $\delta_{md}=\phi_d\cdot\delta_d+\phi_t\cdot\delta_t$ $\phi_h$, $\phi_d$, $\phi_t$; volume fraction of hexane, deionized water and THF at the turbid point $(\phi_h=V_h/(V_h+10)$, $\phi_d=V_d/(V_d+10))$ $\delta_h$, $\delta_d$, $\delta_t$; SP values of hexane, deionized water and THF
$V_h$, $V_d$, $V_t$; molecular volumes (ml/mol) of hexane, deionized water and THF.

Examples of vinyl monomers used for manufacturing the acrylic resin include:

aromatic vinyl monomers such as styrene, α-methylstyrene, p-(t-butyl)styrene and vinyltoluene;

(meth)acrylates such as methyl(meth)acrylate, ethyl(meth)acrylate, n-propyl(meth)acrylate, i-propyl(meth)acrylate, n-butyl(meth)acrylate, i-butyl(meth)acrylate, t-butyl(meth)acrylate, 2-ethylhexyl(meth)acrylate, lauryl(meth)acrylate, cyclohexyl(meth)acrylate, benzyl(meth)acrylate, isobornyl(meth)acrylate, dibromopropyl(meth)acrylate, tribromophenyl(meth)acrylate and alkoxyalkyl(meth)acrylate;

diesters of unsaturated dicarboxylic acid, such as maleic acid, fumaric acid and itaconic acid, with monovalent alcohol;

vinyl esters such as vinyl acetate, vinyl benzoate and "VEOVA" (produced by Japan Epoxy Resins Co., Ltd., trade name for vinyl ester);

fluorine-containing polymerizable compounds such as vinyl esters, vinyl ethers, (meth)acrylates and unsaturated polycarboxylic acid esters that contain (per)fluoroalkyl groups, such as "VISKOTE 8F, 8FM, 17FM, 3F or 3FM" (produced by Osaka Organic Chemical Industry Ltd., trade name for a fluorine-containing acrylic monomer), perfluorocyclohexyl(meth)acrylate, di-perfluorocyclohexyl fumarate and N-i-propylperfluorooctanesulfoneamidoethyl(meth)acrylate;

amide bond-containing vinyl monomers such as (meth)acrylamide, dimethyl(meth)acrylamide, N-t-butyl(meth)acrylamide, N-octyl(meth)acrylamide, diacetoneacrylamide, dimethylaminopropylacrylamide and alkoxylated N-methylolated(meth)acrylamide;

various dialkylaminoalkyl(meth)acrylates such as dimethylaminoethyl(meth)acrylate and diethylaminoethyl(meth)acrylate;

carboxyl group-containing vinyl monomers such as (meth)acrylic acid, crotonic acid, maleic acid, fumaric acid and itaconic acid;

hydroxyl group-containing (meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate and 4-hydroxybutyl(meth)acrylate; and other copolymerizable vinyl monomers such as (meth)acrylonitrile, glycidyl(meth)acrylate, (β-methyl)glycidyl(meth)acrylate, allylglycidylether, vinylethoxysilane, α-methacryloxypropyltrimethoxysilane, trimethylsiloxyethyl(meth)acrylate.

The acrylic resin used as the dye migration preventive resin layer 13 can be manufactured using the above-described vinyl monomers by a known polymerization (reaction) method such as a batch type, a semi-batch type and a continuous type solution polymerization method under a normal atmospheric pressure or applied pressure. In this step, known radical generating polymerization catalysts such as azobisisobutyronitrile, benzoyl peroxide, t-butylperoxy benzoate, t-butylperoxy-2-ethyl hexanoate, t-butyl hydroperoxide, di-t-butyl peroxide and cumene hydroperoxide can be used alone or as a mixture of several types according to the polymerization condition.

A solvent to be used in the solution polymerization method may be selected as appropriate from aromatic hydrocarbons such as toluene and xylene, and solvents such as ester solvents, ketone solvents and alcohol solvents.

An example of the manufacture of the acrylic resin with SP values of 9.0 or more will be described below.

REFERENCE EXAMPLE 1

1000 parts of n-butyl acetate was put in a four-necked flask equipped with a stirrer, a thermometer, an inert-gas inlet and a condenser, and then a temperature was increased to 110° C. Next, a mixture containing: 650 parts of methyl methacrylate; 245 parts of n-butyl methacrylate; 100 parts of 2-hydroxyethyl methacrylate; 5 parts of methacrylic acid; and 15 parts of t-butylperoxy-2-ethyl hexanoate was dropped at 110° C. over the course of 4 hours. After the dropping, the temperature was kept at 110° C. so as to continue the reaction for 6 hours, thereby obtaining an acrylic copolymer (a-1) with a nonvolatile content of about 50%. After the thus obtained acrylic copolymer (a-1) was dried, its SP value was measured, which was 10.16.

REFERENCE EXAMPLES 2 TO 6

Acrylic copolymers (a-2) to (a-6) were obtained in the same manner as Reference Example 1 except that the ratio of the vinyl monomers was changed to the ratios as shown in Table 1. In addition, their SP values measured after the drying are shown in Table 1.

TABLE 1

| Vinyl monomers (parts) | a-2 | a-3 | a-4 | a-5 | a-6 |
| --- | --- | --- | --- | --- | --- |
| styrene | 100 | 200 | — | 200 | — |
| methyl methacrylate | 200 | 500 | 800 | — | 400 |
| ethyl methacrylate | 200 | — | — | 450 | — |
| ethyl acrylate | — | — | 190 | — | 100 |
| n-butyl methacrylate | 100 | 200 | — | — | 300 |
| t-butyl methacrylate | — | — | — | 200 | — |
| n-butyl acrylate | 195 | 95 | — | 150 | 190 |
| 2-hydroxyethyl methacrylate | 200 | — | — | — | — |
| methacrylic acid | 5 | 5 | 10 | — | 10 |
| S P values | 9.79 | 9.64 | 10.49 | 9.02 | 9.54 |

It is preferable to use, as the dye migration preventive resin layer 13, a resin containing such acrylic resins as main components in an uncured state, or a three-dimensionally structured polymer that is obtained by crosslinking an acrylic resin having a reactive functional group with a curable material that reacts with this reactive functional group, because the migration of the sublimable dye can be prevented.

The dye migration preventive resin layer 13 may contain an additive arbitrarily.

A dried film thickness of the dye migration preventive resin layer 13 ranges, for example, from about 1 μm to about 100 μm, preferably ranges from about 2 μm to about 80 μm, and more preferably ranges from about 3 μm to about 60 μm.

The dye migration preventive resin layer 13 is preferably a biaxially stretched film that is stretched by 10% or more in a winding direction and in a width direction respectively. The dye migration preventive resin layer 13 preferably has a shrinkage ratio of 1.0% or less in the winding direction after being heated at 150° C. for 30 minutes. The elongation percentage of the biaxially stretched film preferably is 50% or more, more preferably 100% or more, and still more preferably 200% or more. The elongation percentage of 10% or more can prevent the migration of the sublimable dye sufficiently. In addition, the biaxially stretched film preferably is annealed at a temperature of the glass transition temperature or more, while being fixed in length or relaxed by the applied heat. This is intended to suppress the occurrence of wrinkles and streaks that are caused by the shrinkage of the biaxially stretched film due to the heat applied for allowing the sublimable dye to penetrate the inside of the resin so as to color it. The shrinkage ratio is preferably 0.8% or less, and more preferably 0.6% or less. The shrinkage ratio of 1.0% or less can suppress the occurrence of such wrinkles and streaks that are caused by the shrinkage of the biaxially stretched film during the heating. The biaxially stretched film is particularly preferably a polyester film.

In addition, the sublimable dye used in the present invention is preferably a dye that is sublimated or vaporized under an atmospheric pressure and at a temperature ranging from 70° C. to 260° C. Examples of such a sublimable dye include dyes and basic dyes such as azo compounds, anthraquinones, quinophthalones, styryls, diphenylmethanes, triphenylmethanes, oxazins, triazines, xanthenes, methine compounds, azomethines, acridines and diazines. Among them, as the dye, 1,4-dimethylaminoanthraquinone, brominated or chlorinated 1,5-dihydroxy-4,8-diamino-anthraquinone, 1,4-diamino-2,3-dichloro-anthraquinone, 1-amino-4-hydroxy-anthraquinone, 1-amino-4-hydroxy-2-(β-methoxyethoxy) anthraquinone, 1-amino-4-hydroxy-2-phenoxyanthraquinone, methylester, ethylester, propylester and butylester of 1,4-diaminoanthraquinone-2-carboxylic acid, 1,4-diamino-2-methoxyanthraquinone, 1-amino-4-anilinoanthraquinone, 1-amino-2-cyano-4-anilino (or cyclohexylamino) anthraquinone, 1-hydroxy-2(p-acetaminophenylazo)-4-methylbenzene, 3-methyl-4-(nitrophenylazo) pyrazolone, 3-hydroxyquinophthalone and the like are preferable.

As the basic dye, for example, malachite green, methyl violet and the like can be used. Among them, the basic dye is preferably a dye that is denatured with sodium acetate, sodium ethylate, sodium methylate or the like.

EMBODIMENT 5

Figure 5:
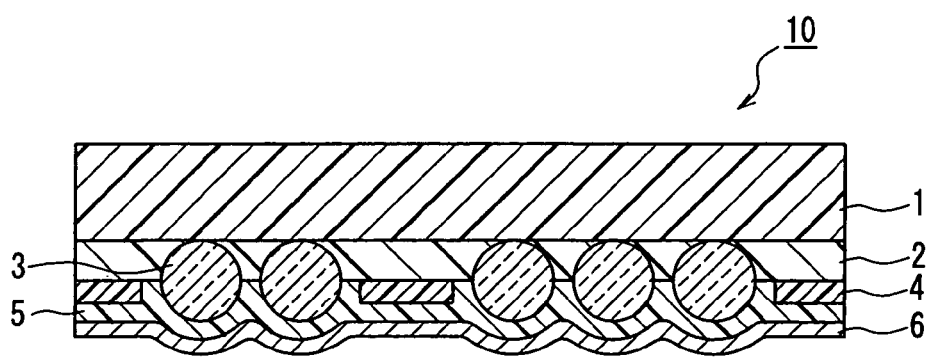
FIG. 5 is a cross-sectional view showing an example of the original sheet of the retroreflective sheet for security of the present invention.
Figure 6:
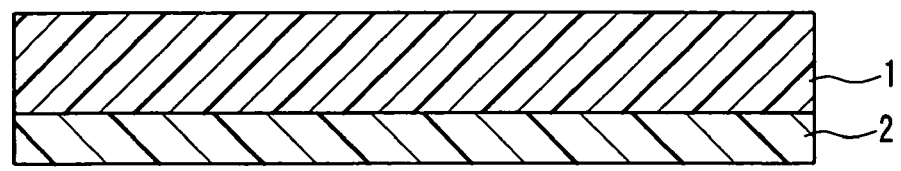
FIG. 6 is a cross-sectional view showing an example of a process of manufacturing the retroreflective sheet for security of the present invention.
Figure 7:
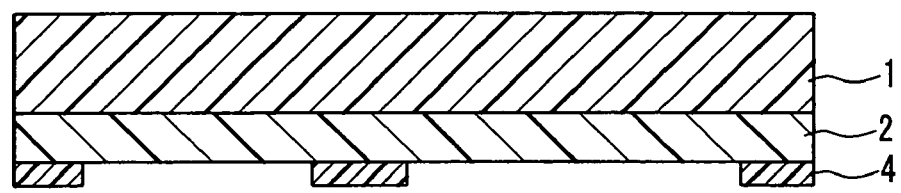
FIG. 7 is a cross-sectional view showing an example of the process of manufacturing the retroreflective sheet for security of the present invention.
Figure 8:
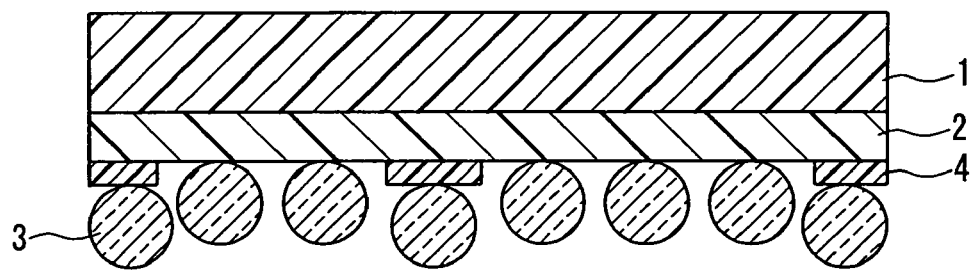
FIG. 8 is a cross-sectional view showing an example of the process of manufacturing the retroreflective sheet for security of the present invention.
Figure 9:
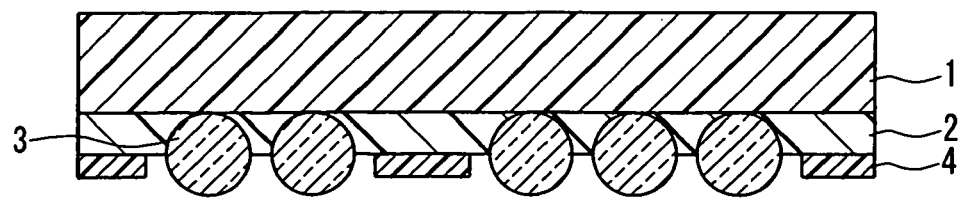
FIG. 9 is a cross-sectional view showing an example of the process of manufacturing the retroreflective sheet for security of the present invention.
Figure 10:
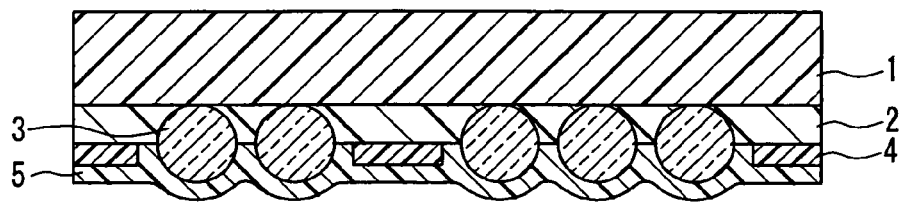
FIG. 10 is a cross-sectional view showing an example of the process of manufacturing the retroreflective sheet for security of the present invention.

FIG. 5 is a cross-sectional view showing an example of the original sheet of the retroreflective sheet for security of the present invention. An original sheet of a retroreflective sheet for security 10 includes a surface layer 1, a binder layer 2, high-refractive-index glass beads 3, a print resin layer 4, a focusing layer 5 and a metal layer 6 that are laminated in this order. The surface layer 1, the binder layer 2, the high-refractive-index glass beads 3, the print resin layer 4, the focusing layer 5 and the metal layer 6 are as described above in Embodiment 1. For example, by forming a pressure-sensitive adhesive layer 7 on the metal layer 6 of the original sheet of the retroreflective sheet for security 10, a retroreflective sheet for security 100 can be obtained. The pressure-sensitive adhesive layer 7 is as described above in Embodiment 1.

EMBODIMENT 6

Next, an example of the method for manufacturing the retroreflective sheet for security of the present invention will be described. In FIGS. 6 to 10, reference numeral 1 denotes a surface layer, 2 denotes a binder layer, 3 denotes high-refractive-index glass beads, 4 denotes a print resin layer, and 5 denotes a focusing layer.

As mentioned above, the method includes: laminating the binder layer 2 on the surface layer 1 (see FIG. 6); printing on the binder layer 2 so as to form the print resin layer 4 (see FIG. 7); curing the print resin layer 4 at room temperature; heating the binder layer 2 to a temperature at which the binder layer 2 generates stickiness; embedding the high-refractive-index glass beads 3 in a part of the binder layer 2 where the print resin layer 4 is not formed (see FIGS. 8 and 9); laminating the focusing layer 5 on the binder layer 2 (see FIG. 10); forming a metal layer on the focusing layer 5; and forming a pressure-sensitive adhesive layer on the metal layer.

The step of laminating the binder layer 2 on the surface layer 1 can include: applying a solution containing a resin for forming the binder layer so that a dried film thickness of the binder layer 2 may be 10% to 90% of a particle diameter of the used high-refractive-index glass beads 3, preferably 20% to 80%, and more preferably 30% to 70%; and volatilizing the solvent by drying at room temperature or heat-drying. The solvent is volatilized preferably by heating at or below a temperature at which the curing of the resin for forming the binder layer proceeds. A probe tack of the thus formed binder layer after the volatilization of the solvent ranges, for example, from 0 gf to 40 gf (0 mN to 392 mN) at an environment temperature of 23±2° C., preferably ranges from 0 gf to 30 gf (0 mN to 294 mN), and more preferably ranges from 0 gf to 20 gf (0 mN to 196 mN).

Since a speed of the printing step for printing on the binder layer 2 so as to form the print resin layer 4 is generally much higher than a speed of forming the binder layer 2, a sheet of the binder layer 2 is required to be wound up once after its formation, when proceeding to the step of printing to form the print resin layer 4 as a next step. Herein, the probe tack of the binder layer 2 is preferably 40 gf (392 mN) or less at the environment temperature of 23±2° C., because occurrence of a blocking phenomenon in the sheet of the binder layer 2 at the time of the winding can be suppressed. Moreover, the probe tack in such a range is preferable because the binder layer 2 can be conveyed smoothly without adhering to a guide roll while printing to form the print resin layer 4.

The probe tack means a tack strength that is measured by using a probe tack tester (produced by NICHIBAN CO., LTD., in conformity with ASTM D-2979) with a probe rod of 5 mm$\phi$ made of stainless steel having a mirror surface polished with AA#400, under a testing condition of: a releasing speed of 1 cm/second; a measurement load of 9.8±0.1 g (made of brass); a contact time of 1 second; measurement environment of 23±2° C.; and a relative humidity of 65±5%.

The step of printing on the binder layer 2 so as to form the print resin layer 4 can be performed by a known method such as gravure printing, silk screen printing, flexographic printing and letterpress printing.

The step of curing the print resin layer 4 at room temperature can be performed at room temperature for, for example, 7 days, preferably for 10 days, and more preferably for 14 days.

The step of heating the binder layer 2 to the temperature at which the binder layer 2 generates stickiness varies according to a kind of the resin for forming the binder layer 2, but can be performed at, for example, 90° C. to 110° C., preferably at 100° C. to 120° C., and more preferably at 110° C. to 130° C. Moreover, a time for heating ranges, for example, from 0.5 minutes to 1 minute, preferably ranges from 1 minute to 2 minutes, and more preferably ranges from 1.5 minutes to 3 minutes.

The step of embedding the high-refractive-index glass beads 3 in the part of the binder layer 2 where the print resin layer 4 is not formed, for example, includes: heating the binder layer 2 so as to provide stickiness thereto; and then dipping a laminate including the surface layer 1, the binder layer 2 and the print resin layer 4 into a bath containing the glass beads, or scattering the high-refractive-index glass beads 3 on the surface of the binder layer 2 of the laminate. Then, the high-refractive-index glass beads 3 can be attached only onto an area of the binder layer 2 with the stickiness, and are not attached onto an area without tack. Thereafter, when the binder layer 2 is further heated, the glass beads 3 sink into the binder layer 2, and are fixed. Subsequently, a surplus of the glass beads 3 is preferably removed by being aspirated by a vacuum or by being washed with water or the like.

The step of laminating the focusing layer 5 on the binder layer 2, the print resin layer 4 and the high-refractive-index glass beads 3 may include: applying a solution of a resin composition for the focusing layer so as to obtain a dried film thickness most appropriate for the focusing layer 5; and then drying it at room temperature or by heating. A condition for the drying can be determined as appropriate, according to the kind of resin for the focusing layer, the kind of reactive functional group in the resin for the focusing layer, the kind of hardener and the kind of solvent. The application of the solution of the resin composition for the focusing layer may be performed by using a coater such as a knife coater, a comma coater, a roll coater, a reverse roll coater and a flow coater, or by spray coating.

The step of forming the metal layer on the focusing layer 5 can be performed by a general evaporation method, a sputtering method, a transfer printing method, a plasma method or the like. In particular, in terms of the processability, an evaporation method and a sputtering method preferably are applied.

The step of forming the pressure-sensitive adhesive layer on the metal layer can be performed according to a conventionally known general method.

EMBODIMENT 7

Next, an example of the method for manufacturing the retroreflective sheet for security of the present invention, wherein the surface layer includes: a surface resin layer that has a weak affinity with the sublimable dye and allows the dye to penetrate; an image formation resin layer having an affinity with the dye; and a dye migration preventive resin layer for preventing migration of the dye, in this order from a surface side of the surface layer, and the dye migration preventive resin layer is a resin layer containing a vinyl resin with a glass transition temperature (Tg) of 70° C. or more and a SP value of 9.0 or more as a main component, will be described. As mentioned above, this manufacturing method includes: providing the surface resin layer; forming the image formation resin layer on the surface resin layer; forming the dye migration preventive resin layer on the image formation resin layer; laminating a binder layer on the dye migration preventive resin layer; printing on the binder layer so as to form a print resin layer; curing the print resin layer at room temperature; heating the binder layer to a temperature at which the binder layer generates stickiness; embedding high-refractive-index glass beads in a part of the binder layer where the print resin layer is not formed; laminating a focusing layer on the binder layer, the print resin layer and the high-refractive-index glass beads; forming a metal layer on the focusing layer; and forming a pressure-sensitive adhesive layer on the metal layer. The surface resin layer may be provided by forming the resin as the material for forming the surface resin layer as a film by a processing method such as a solvent casting method (a casting method) or the like. The step of forming the image formation resin layer on the surface resin layer can include, for example, applying a solution of the material for the image formation resin layer on the surface resin layer, and then drying the solution. The step of forming the dye migration preventive resin layer on the image formation resin layer can include, for example, applying the vinyl resin for the dye migration preventive resin layer on the image formation resin layer, and then drying the vinyl resin. The step of laminating the binder layer on the dye migration preventive resin layer is the same as the step of laminating the binder layer 2 on the surface layer 1 in Embodiment 6. The step of printing on the binder layer so as to form the print resin layer, the step of curing the print resin layer at room temperature, the step of heating the binder layer to the temperature at which the binder layer generates the stickiness, the step of embedding the high-refractive-index glass beads in the part of the binder layer where the print resin layer is not formed, the step of laminating the focusing layer on the binder layer, the print resin layer and the high-refractive-index glass beads, the step of forming the metal layer on the focusing layer, and the step of forming the pressure-sensitive adhesive layer on the metal layer are the same as those in Embodiment 6.

EMBODIMENT 8

Next, an example of the method for manufacturing the retroreflective sheet for security of the present invention, wherein the surface layer includes: a surface resin layer that has a weak affinity with the sublimable dye and allows the dye to penetrate; an image formation resin layer having an affinity with the dye; and a dye migration preventive resin layer for preventing migration of the dye, in this order from a surface side of the surface layer, and the dye migration preventive resin layer is a biaxially stretched film that is stretched by 10% or more in a winding direction and in a width direction respectively, will be described. As mentioned above, this manufacturing method includes: providing the biaxially stretched film as the dye migration preventive resin layer; laminating a binder layer on the dye migration preventive resin layer; printing on the binder layer so as to form a print resin layer; curing the print resin layer at room temperature; heating the binder layer to a temperature at which the binder layer generates stickiness; embedding high-refractive-index glass beads in a part of the binder layer where the print resin layer is not formed; laminating a focusing layer on the binder layer, the print resin layer and the high-refractive-index glass beads; forming a metal layer on the focusing layer; forming a pressure-sensitive adhesive layer on the metal layer by attaching the pressure-sensitive adhesive layer that is separately formed on a releasing film onto the metal layer so that they may face each other, so as to protect the pressure-sensitive adhesive layer by the releasing film; forming the image formation resin layer on the dye migration preventive resin layer; and forming the surface resin layer on the image formation resin layer. The dye migration preventive resin layer can be provided by stretching a polyester film biaxially. The step of laminating the binder layer on the dye migration preventive resin layer is the same as the step of laminating the binder layer 2 on the surface layer 1 in Embodiment 6. The step of printing on the binder layer so as to form the print resin layer, the step of curing the print resin layer at room temperature, the step of heating the binder layer to the temperature at which the binder layer generates the stickiness, the step of embedding the high-refractive-index glass beads in the part of the binder layer where the print resin layer is not formed, the step of laminating the focusing layer on the binder layer, the print resin layer and the high-refractive-index glass beads, the step of forming the metal layer on the focusing layer, and the step of forming the pressure-sensitive adhesive layer on the metal layer are the same as those in Embodiment 6. The step of forming the image formation resin layer on the dye migration preventive resin layer can include, for example, applying a solution of the material for the image formation resin layer on the dye migration preventive resin layer, and then drying the solution. The step of forming the surface resin layer on the image formation resin layer can include applying a resin as a material for forming the surface resin layer on the image formation resin layer, and then drying the resin.

EMBODIMENT 9

Figure 11:
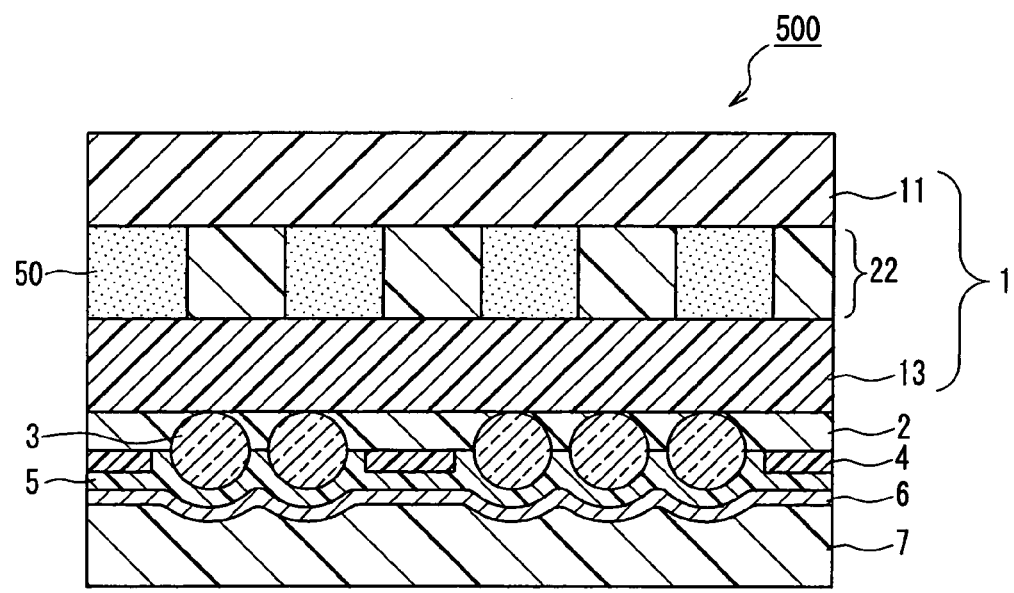
FIG. 11 is a cross-sectional view showing an example of the image-added retroreflective sheet for security of the present invention.

Next, an example of the image-added retroreflective sheet for security of the present invention will be described. FIG. 11 is a cross-sectional view showing an example of the image-added retroreflective sheet for security of the present invention. An image-added retroreflective sheet for security 500 includes a surface layer 1, a binder layer 2, high-refractive-index glass beads 3, a print resin layer 4, a focusing layer 5, a metal layer 6 and a pressure-sensitive adhesive layer 7 that are laminated in this order. The surface layer 1 includes a surface resin layer 11, a print layer 22 including a dyeing layer 50) and a dye migration preventive resin layer 13 that are laminated in this order.

The binder layer 2, the high-refractive-index glass beads 3, the print resin layer 4, the focusing layer 5, the metal layer 6, the pressure-sensitive adhesive layer 7, the surface resin layer 11 and the dye migration preventive resin layer 13 are as described above in Embodiment 3. Preferably, a self-destructive layer further is included between the focusing layer and the metal layer. This self-destructive layer is as described above in Embodiment 2. More preferably, the self-destructive layer is further included, and besides, the pressure-sensitive adhesive layer is disposed between the metal layer and the self-destructive layer. This self-destructive layer is as described above in Embodiment 3.

The print layer 22 is a layer in which an image is formed in a thickness direction of the layer by the sublimable dye, and has the same structure as the image formation resin layer 12 except including the dyeing layer 50. The dyeing layer 50 is a layer in which the image is formed in a thickness direction of the layer by the sublimable dye.

EMBODIMENT 10

Next, an example of the first method for manufacturing the image-added retroreflective sheet for security of the present invention will be described.

As described above, the first method for manufacturing the image-added retroreflective sheet for security includes: printing on a transfer paper by using an ink containing a sublimable dye; contacting an image-formed surface of the transfer paper with the surface resin layer of the retroreflective sheet for security of the present invention; heat-treating subsequently so as to sublimate the sublimable dye, allow the sublimable dye to penetrate the surface resin layer and form an image in the image formation resin layer for obtaining the print layer; and removing the transfer paper after the heat treatment. The retroreflective sheet for security of the present invention used in the first method for manufacturing the image-added retroreflective sheet for security of the present invention includes: the surface resin layer; the image formation resin layer; the dye migration preventive resin layer; the binder layer; the high-refractive-index glass beads; the print resin layer; the focusing layer; the metal layer; and the pressure-sensitive adhesive layer in this order.

The step of printing on the transfer paper by using an ink containing the sublimable dye can be performed by, for example, an electrophotography method, an electrostatic recording method, an ink jet method and a thermal transfer method.

As the transfer paper, a commercially available printing paper for ink jet, a sublimable transfer paper and the like can be used.

The step of contacting the image-formed surface of the transfer paper with the surface resin layer of the retroreflective sheet for security of the present invention can be performed by, for example, contacting the printed surface of the transfer paper with the surface resin layer of the retroreflective sheet for security, and expelling air trapped between the transfer paper and the surface resin layer so as to obtain sufficient adhesion therebetween.

As a method for the heat treatment, for example, a method of heating at about 100° C. to about 200° C. for several tens of seconds to several minutes using a heat vacuum applicator, an oven drier, a far infrared heating apparatus and the like can be used. By the heating, the sublimable dye is sublimated from the transfer paper, penetrates the surface resin layer 11, migrates into the image formation resin layer 12, and is diffused for dyeing in the image formation resin layer 12, thereby forming the image. Thus, the image can be formed in the thickness direction of the image formation resin layer 12, thereby obtaining the print layer 22 including the dyeing layer 50.

EMBODIMENT 11

Figure 12:
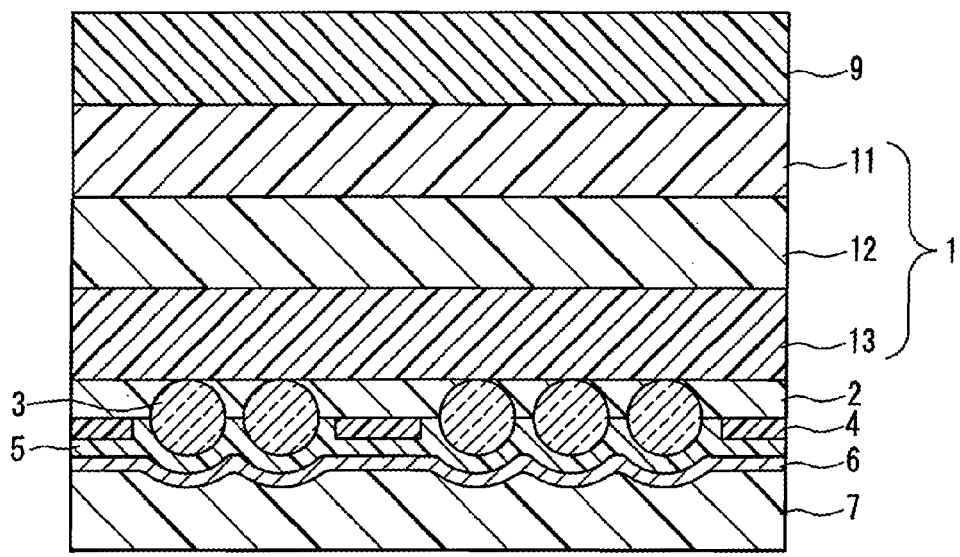
FIG. 12 is a cross-sectional view showing an example of a process of manufacturing the image-added retroreflective sheet for security of the present invention.

Next, an example of the second method for manufacturing the image-added retroreflective sheet for security of the present invention will be described. In FIG. 12, reference numeral 9 denotes a releasable ink receptive layer, 11 denotes a surface resin layer, 12 denotes an image formation resin layer, 13 denotes a dye migration preventive resin layer, 2 denotes a binder layer, 3 denotes high-refractive-index glass beads, 4 denotes a print resin layer, 5 denotes a focusing layer, 6 denotes a metal layer, and 7 denotes a pressure-sensitive adhesive layer.

As described above, the second method for manufacturing the image-added retroreflective sheet for security includes: forming, on the surface resin layer of the retroreflective sheet for security of the present invention, the releasable ink receptive layer that can display by print, has absorption of the ink containing the dye on a surface that is not contact with the surface resin layer, can be subjected to heat treatment for sublimating the dye and allowing the dye to penetrate the surface resin layer so as to form an image in the image formation resin layer, and can be released in a state of a film from the surface resin layer after the heat treatment (see FIG. 12); printing on the ink receptive layer by using the ink containing the sublimable dye; heat-treating subsequently so as to sublimate the sublimable dye, allow the sublimable dye to penetrate the surface resin layer and form an image in the image formation resin layer for obtaining the print layer; and releasing the releasable ink receptive layer. The retroreflective sheet for security of the present invention used in the second method for manufacturing the image-added retroreflective sheet for security of the present invention includes: the surface resin layer; the image formation resin layer; the dye migration preventive resin layer; the binder layer; the high-refractive-index glass beads; the print resin layer; the focusing layer; the metal layer; and the pressure-sensitive adhesive layer in this order.

The releasable ink receptive layer 9 may be manufactured from a hydrophilic resin, for example. Examples of the hydrophilic resin include a polyurethane resin, an acrylic resin, a fluororesin, non-denatured or denatured polyvinyl alcohol, a polyester resin, an acrylic urethane resin, a vinyl acetate resin, a maleic anhydride copolymer, a sodium salt of alkyl ester, gelatin, albumin, casein, starch, SBR latex, NBR latex, a cellulose resin, an amide resin, a melamine resin, polyacrylamide and polyvinyl pyrrolidone. These materials also may be cationic-denatured or may include hydrophilic groups added thereto. They may be used alone or in combination of two kinds or more.

To the releasable ink receptive layer 9, a filler such as silica, clay, talc, diatomaceous earth, zeolite, calcium carbonate, alumina, zinc oxide and titanium may be added.

The releasable ink receptive layer 9 can be formed by applying a solution of the resin material on the surface resin layer 11 and heat-drying.

Examples of a method for printing on the releasable ink receptive layer 9 by using the ink containing the dye include heat transfer printing, electrostatic printing, gravure printing and an ink jet printing method. Among them, an ink jet printing method is preferable as the printing method. This is because it can facilitate full color printing. In particular, an on-demand-type ink jet method is preferable, because it is economical in terms of usage efficiency of the ink.

As the method for the heating, for example, a method of heating at about 100° C. to about 200° C. for several tens of seconds to several minutes by using a heat vacuum applicator, an oven drier, a far infrared heating apparatus and the like can be used. The heating temperature more preferably ranges 150° C. to 200° C. This is because the temperature in such a range can enhance the capability for carrying out the sublimation of the sublimable dye in a shorter period of time effectively. Moreover, it is preferable to dry the printed surface of the releasable ink receptive layer 9 at a tacky-dry level, in advance of the heating. This is because the sublimable dye can be diffused uniformly during the heat treatment.

The retroreflective sheet for security of the present invention further may include a releasing member such as a releasing paper and a releasing film attached onto the pressure-sensitive adhesive layer. The releasing member is not limited particularly, and a known releasing member can be used.

EXAMPLES

A more specific description will be provided below by way of examples. Hereinafter, in the examples, a "part" represents a part by weight. Similarly, "%" represents weight %.

Example 1

Firstly, a biaxially stretched polyester film was provided as a surface layer 1, a resin composition for forming a binder layer 2 was applied on the surface layer 1 so as to obtain a dried film thickness of about 30 µm, and a solvent was volatilized by heat-drying at 70° C. for 5 minutes so as to form the binder layer 2, thereby obtaining a laminate of the surface layer 1 and the binder layer 2. The resin composition used here for forming the binder layer 2 contained: 5 parts of Bekkolite M-6401-50 (produced by Dainippon Ink and Chemicals, Inc., an oil-free alkyd resin, solid content of 50%); 1.5 parts of Super Beckamine J-820-60 (produced by Dainippon Ink and Chemicals, Inc., a butylated melamine resin, solid content of 60%); 0.5 parts of Beckamine P-198 (produced by Dainippon Ink and Chemicals, Inc., a hardening catalyst); 70 parts of an olefinic special copolymer Elvaloy 551 (produced by Du Pont-Mitsui Polychemical Co., Ltd., a THF solution of 25%); 15 parts (solid content of 45%) of an acrylic resin (composed of styrene/methyl methacrylate/a soft monomer, Tg of 50° C., hydroxyl value of about 14); and 3 parts of an epoxy plasticizer O-130P (produced by ASAHI DENKA CO., LTD.).

Herein, a probe tack strength of the binder layer 2 was 3 gf (29.4 mN). The probe tack means a tack strength that is measured by using a probe tack tester (produced by NICHIBAN CO., LTD., in conformity with ASTM D-2979) with a probe rod of 5 mmφ made of stainless steel having a mirror surface polished with AA#400, under a testing condition of: a releasing speed of 1 cm/second; a measurement load of 9.8±0.1 g (made of brass); a contact time of 0.1 second; measurement environment of 23±2° C.; and a relative humidity of 65±5%.

A sheet of the laminate was wound up, and a mark subsequently was printed on the binder layer 2 by a gravure printer using a resin composition for forming a print resin layer 4 so as to form the print resin layer 4, thereby obtaining a laminate of the surface resin layer 1, the binder layer 2 and the print resin layer 4. The resin composition for forming the print resin layer 4 contained: 100 parts of a hydroxyl group-containing acrylic resin (produced by Dainippon Ink and Chemicals, Inc., solid content of 45%, a solvent was xylene, butyl acetate and toluene, hydroxyl-value of 45); 23 parts of an isocyanate prepolymer (produced by Dainippon Ink and Chemicals, Inc., solid content of 75%, a solvent was ethyl acetate, NCO content ratio of 15%) as a hardener; and 10 parts of butylcellosolve acetate.

Next, the laminate was subjected to aging at room temperature for about 1 week so that curing of the print resin layer 4 could proceed. Next, the laminate was heated at 120° C. for 1 minute so that the binder layer 2 could generate stickiness. High-refractive-index glass beads (high-refractive-index glass beads containing titanium oxide as a main component, with a refractive index of 2.23 and particle diameters ranging from 67 µm to 73 µm) 3 were scattered from the print resin layer 4 side so as to be attached onto the binder layer 2, heat was subsequently applied at 140° C. for 5 minutes, and the high-refractive-index glass beads 3 were embedded only in an area of the binder layer 2 with the stickiness and were fixed therein.

Next, a resin composition for forming a focusing layer 5 was applied on the binder layer 2, the print resin layer 4 and the high-refractive-index glass beads 3 of the laminate so as to obtain a dried film thickness of 16 µm, was dried by heating at 100° C. for 10 minutes, and was dried further at 140° C. for 10 minutes so as to volatilize a solvent, thus forming the focusing layer 5. Thereby, a laminate of the surface layer 1, the binder layer 2, the high-refractive-index glass beads 3, the print resin layer 4 and the focusing layer 5 was obtained. The resin composition for forming this focusing layer 5 contained: 100 parts of a polyurethane resin BURNOCK L8-974 (produced by Dainippon Ink and Chemicals, Inc.); and 10 parts of Super Beckamine J-820-60 (produced by Dainippon Ink and Chemicals, Inc.).

Next, aluminum (a material for the metal layer 6) was deposited on the focusing layer 5 of the laminate by vacuum evaporation so as to obtain a film thickness of 500 Å, thereby obtaining a laminate containing the surface layer 1, the binder layer 2, the high-refractive-index glass beads 3, the print resin layer 4, the focusing layer 5 and the metal layer 6 (the laminate was the original sheet of the retroreflective sheet for security of the present invention).

Figure 14:
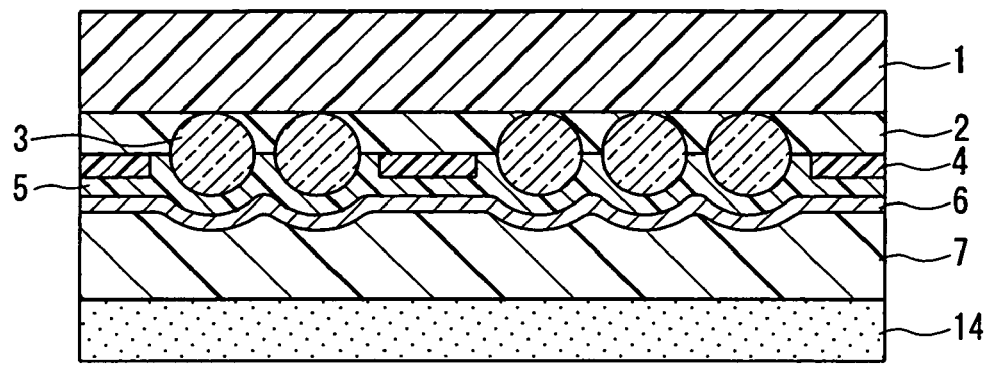
FIG. 14 is a cross-sectional view showing an example of the retroreflective sheet for security with the releasing member of the present invention.

On a biaxially stretched polyester releasing film (one surface thereof was coated with silicone, and the other surface thereof was subjected to antistatic processing and was annealed, thickness of 50 µm, produced by Teijin DuPont Films Japan Limited, trade name of A-31, a shrinkage ratio of 0.4% in the winding direction of the film after being heated at 150° C. for 30 minutes) (a releasing member 14) that was provided separately, a mixed solution containing: about 100 parts of an acrylic pressure-sensitive adhesive FINETAC SPS-1016 (produced by Dainippon Ink and Chemicals, Inc.); about 2 parts of a crosslinking agent FINETAC TA-101-K (produced by Dainippon Ink and Chemicals, Inc., a chelate-type hardener for pressure-sensitive adhesives); about 2 parts of TINUVIN 900; and 0.2 parts of an ultraviolet absorber TINUVIN 900 was applied so as to obtain a dried film thickness of 40 µm, and was dried by heating at about 100° C. for about 5 minutes, thereby forming a pressure-sensitive adhesive layer 7. The thus obtained pressure-sensitive adhesive layer 7 was attached onto the metal layer 6 of the laminate so that they might face each other, thereby obtaining the retroreflective sheet for security with the releasing member of the present invention (see FIG. 14).

When the retroreflective sheet for security was observed from the surface layer 1 side, the mark formed by the print resin layer 4 could be identified visually in a metallic tone. In addition, when the retroreflective sheet for security was irradiated with light in the night time, the retroreflective sheet for security except a part of the mark glared brightly by a retroreflective effect, whereas, the part of the mark was still dark. By virtue of the resultant contrast, the mark of the retroreflective sheet for security could be identified visually clearly.

Example 2

A binder layer 2 and a print resin layer 4 were formed in the same manner as Example 1, except using a biaxially stretched polyester film (produced by Teijin DuPont Films Japan Limited, trade name: HSLF8W) having a shrinkage ratio of 0.5% in a winding direction of the film after being heated at 150° C. for 30 minutes instead of using the biaxially stretched polyester film (the surface layer 1), high-refractive-index glass beads 3 were embedded, and a focusing layer 5 was formed. Herein, the biaxially stretched polyester film was used not as the surface layer 1 but as a dye migration preventive resin layer 13. Therefore, the thus obtained laminate included the dye migration preventive resin layer 13, the binder layer 2, the high-refractive-index glass beads 3, the print resin layer 4 and the focusing layer 5.

Next, on the focusing layer 5 of the laminate, letters of "OFFICIAL USE" were printed in a traveling direction of the sheet and in a width direction thereof at constant intervals as a predetermined pattern by a gravure coater using addition type releasing silicone. The addition type releasing silicone was a mixed solution (produced by GE TOSHIBA SILICONE CO., LTD., XSR7029A/XSR7029B/XSR7029C/n-hexane=100/15/3/482). After the printing, the mixed solution was dried by heating at 140° C. for 60 seconds, thereby forming a self-destructive layer 8. Subsequently, after curing it at 25° C. for 24 hours, a metal layer 6 was formed on the self-destructive layer 8 in the same manner as Example 1, thereby obtaining a laminate of the dye migration preventive resin layer 13, the binder layer 2, the high-refractive-index glass beads 3, the print resin layer 4, the focusing layer 5, the self-destructive layer 8 and the metal layer 6. Thereafter, a pressure-sensitive adhesive layer 7 and a releasing film (a releasing member 14) were laminated on the metal layer 6 in the same manner as Example 1.

Next, a solution of a resin composition for forming an image formation resin layer 12 was applied on the dye migration preventive resin layer 13 of the laminate so as to obtain a dried film thickness of about 30 µm, and was dried by heating at about 140° C. for about 10 minutes, thereby obtaining the image formation resin layer 12. The content of a low-molecular-weight compound with a molecular weight of about 1300 or less in the obtained image formation resin layer 12 was less than 5%. Herein, the resin composition for forming the image formation resin layer 12 contained: about 100 parts of BURNOCK D6-439 (an alkyd resin produced by Dainippon Ink and Chemicals, Inc., solid content hydroxyl value of 140, non-volatile content of 80%); about 82 parts of BURNOCK DN-980 (a polyisocyanate prepolymer produced by Dainippon Ink and Chemicals, Inc., nonvolatile content of 75%) as a hardener; about 1 part of TINUVIN 900; and about 1 part of TINUVIN 292.

Figure 15:
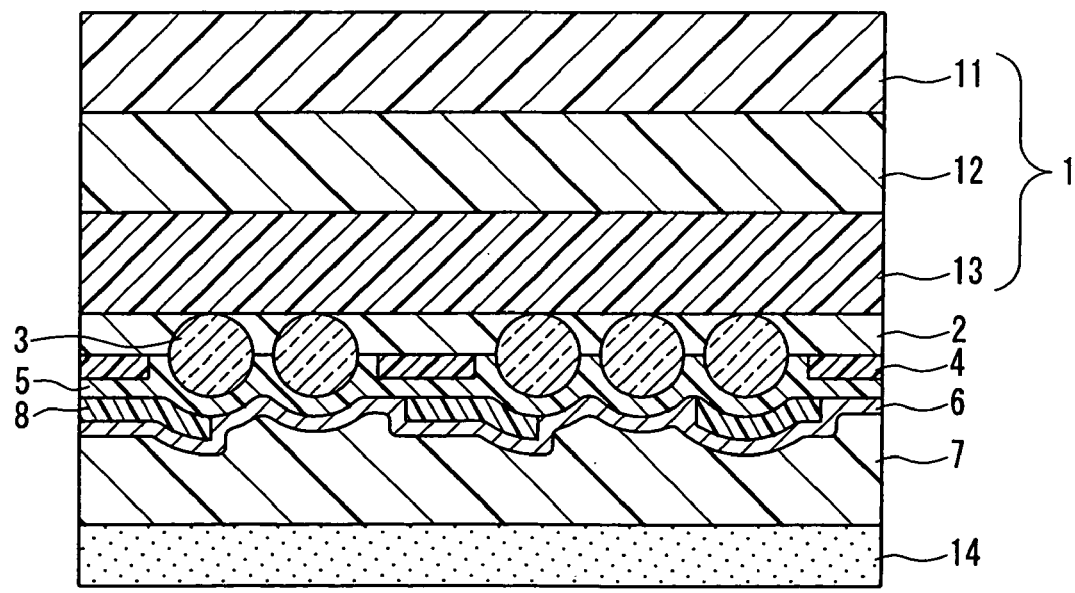
FIG. 15 is a cross-sectional view showing another example of the retroreflective sheet for security with the releasing member of the present invention.

Next, a solution of a resin composition for forming a surface resin layer 11 was applied on the image formation resin layer 12 so as to obtain a dried film thickness of about 20 μm, and was dried by heating at about 140° C. for about 10 minutes, thus forming the surface resin layer 11. Thereby, the retroreflective sheet for security with the releasing member was obtained (see FIG. 15).

The resin composition for forming the surface resin layer 11 contained: about 100 parts of a solution of a copolymer of hexafluoropropylene/ethylvinylether/VEOVA 9/monovinyl adipate=50/15/20/15 (in weight percentage) with a weight average molecular weight of about 45000 ("VEOVA 9": trade name, produced by Japan Epoxy Resins Co., Ltd., vinylester of branched aliphatic acid, a solvent thereof was a mixed solvent of toluene/n-butanol=70/30 (in weight %), non-volatile content of about 50%) as a fluororesin; about 7.4 parts of sorbitol polyglycidylether with an epoxy equivalent of 170; about 0.6 part of diazabicyclo-octane; 12 parts of DICTON WHITE A-5260 (titanium oxide, solid content of 75%); about 1 part of TINUVIN 900 (produced by Ciba Specialty Chemicals Inc., a benzotriazole-based ultraviolet absorber); and about 1 part of TINUVIN 292 (produced by Ciba Specialty Chemicals Inc., a hindered amine-based light stabilizer).

Example 3

Figure 16:
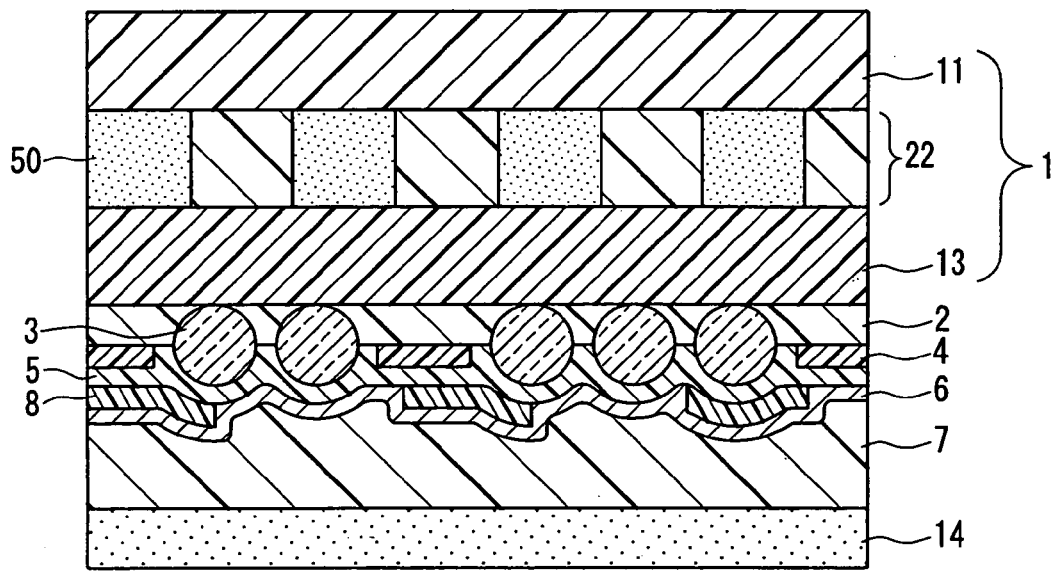
FIG. 16 is a cross-sectional view showing an example of the image-added retroreflective sheet for security with the releasing member of the present invention.

An image was printed on a transfer paper (Gradess S-coat Paper) by a piezo-type printer (RJ-6000 produced by Mutoh Industries Ltd.), which was a kind of ink jet method printer provided separately. A sublimable-type ink for ink jet used here was an ink for ink jet containing a sublimable dye, produced by Kiwa Chemical Ind. Co., Ltd. (a set of six colors including cyan, magenta, yellow, black, light cyan and light magenta). The surface resin layer 11 of the retroreflective sheet for security with the releasing member obtained in Example 2 was superimposed on the printed surface of the transfer paper so that they could be contact with each other, and they were subjected to heat and pressing treatment by using a heat vacuum applicator (produced by HUNT EUROPE, VacuSeal 4468) at a degree of vacuum of $3.99 \times 10^3$ Pa (30 mmHg) and a setting temperature of about 170° C. for about 7 minutes. As a result, the image printed on the transfer paper including a color vehicle, an issue date, a public emblem and the bar code to which individual information such as a zip code was input was dyed by being diffused in the image formation resin layer 12 of the retroreflective sheet for security so as to transfer the image, thus obtaining a print layer 22. Thereafter, the transfer paper was released, thereby obtaining an image-added retroreflective sheet for security with the releasing member (see FIG. 16).

The releasing film (the releasing member) was released, and this image-added retroreflective sheet for security was attached to a rear window of a vehicle from the outside thereof, then the color vehicle, the issue date, the public emblem, and the bar code and the like to which the individual information such as the zip code and the like was input could be identified visually clearly both in the day time and in the night time (the image-added retroreflective sheet for security was irradiated with light in the night time). Moreover, the mark also could be identified visually clearly both in the day time and in the night time. In addition, the bar code to which the individual information was input could be read by a bar code reader. Thereafter, the image-added retroreflective sheet for security was released, then exfoliation occurred between a printed part of "OFFICIAL USE" and the metal layer, and the letters of "OFFICIAL USE" appeared on a surface of the glass of the rear window. In addition, the metal layer except the part of the letters of "OFFICIAL USE" was left on the thus released image-added retroreflective sheet for security, and thus it was possible to recognize that the image-added retroreflective sheet for security was released from the rear window, at one glance. Moreover, the information in the released image-added retroreflective sheet for security could not be tampered, and reuse of the released image-added retroreflective sheet for security was also impossible. Furthermore, the image-added retroreflective sheet for security was kept to be left in a state of being attached to a glass plate at 65° C. for 500 hours, but an edge of the image did not become blurred and sharpness of the image did not deteriorate.

Example 4

First, a surface resin layer 11 was formed. A solution of a resin composition for forming the surface resin layer 11 was applied on a polyester film (a supporting film) so as to obtain a dried film thickness of about 20 μm, and was dried by heating at about 140° C. for about 10 minutes, thereby obtaining the surface resin layer 11 on the supporting film. Herein, the resin composition for forming the surface resin layer 11 contained: about 100 parts of FLUONATE K-703 (produced by Dainippon Ink and Chemicals, Inc., weight average molecular weight of 40000, solid content hydroxyl value of 72, non-volatile content of about 60%) (a fluororesin); about 25 parts of BURNOCK DN-950 (a hardening agent); about 1 part of TINUVIN 900 (an ultraviolet absorber); 15 parts of DICTON WHITE A-5260 (titanium oxide, solid content of 75%); and about 1 part of TINUVIN 292 (an antioxidant).

Next, a polycarbonate-based non-yellowing type urethane resin. NY-331 (produced by Dainippon Ink and Chemicals, Inc., nonvolatile content of about 25%, solvent was DMF, 100% modulus of about 55 kg/cm$^2$) was applied on the surface resin layer 11 so as to obtain a dried film thickness of about 20 μm, and was dried by heating at about 140° C. for about 10 minutes, thereby forming the image formation resin layer 12. The content of a low-molecular-weight compound with a molecular weight of about 1300 or less in the thus obtained image formation resin layer was less than 3%.

Next, a resin composition containing: about 100 parts of an acrylic copolymer (a-2) that was synthesized as described above in Reference Example 2; and about 50 parts of BURNOCK DN-950 (produced by Dainippon Ink and Chemicals, Inc., nonvolatile content of about 75%) as a hardener was applied on the image formation resin layer 12 so as to obtain a dried film thickness of about 15 μm, and was dried by heating at about 140° C. for about 10 minutes, thereby forming a dye migration preventive layer 13.

A binder layer 2 was formed on the dye migration preventive resin layer 13 in the same manner as Example 2. Thereafter, in the same manner as Example 2, a print resin layer 4 was formed, high-refractive-index glass beads 3 was embedded, and a focusing layer 5, a self-destructive layer 8, a metal layer 6, a pressure-sensitive adhesive layer 7 and a releasing film (a releasing member) were laminated, thereby obtaining the retroreflective sheet for security with the releasing member (see FIG. 15).

Example 5

Figure 17:
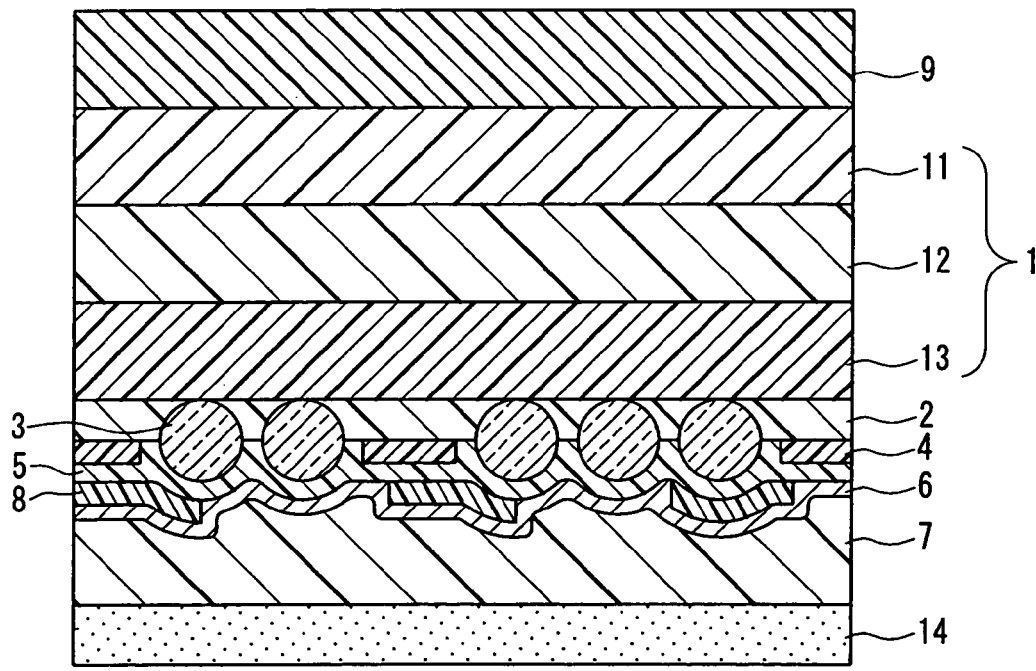
FIG. 17 is a cross-sectional view showing an example of a process of manufacturing the image-added retroreflective sheet for security with the releasing member of the present invention.

On the surface resin layer 11 of the retroreflective sheet for security with the releasing member obtained in Example 4, FLUONATE FEM-600 (solid content of 45%) produced by Dainippon Ink and Chemicals, Inc. as a water-based fluororesin was applied so as to obtain a dried film thickness of about 15 μm, and was dried by heating at about 110° C. for about 5 minutes. Subsequently, on the thus dried film, MZ-100 (amorphous silicon dioxide, a mixture of polyurethane and a vinyl resin, solid content of 15%, content of a porous pigment in the solid content: about 56%) produced by Takamatsu Oil & Fat Co., Ltd. as an ink jet receptive agent was applied so as to obtain a dried film thickness of about 30 μm, and was dried by heating at about 110° C. for about 5 minutes, thereby forming a releasable ink receptive layer 9 (see FIG. 17).

On the releasable ink receptive layer 9, an image was printed in the same manner as Example 3. Thereafter, a heat treatment was performed for about 7 minutes using a hot-air drier (Fine Oven DF6L produced by Yamato Scientific Co. Ltd.) that was set at about 170° C., so that the image including a color vehicle, an issue date, a public emblem, and a bar code to which individual information such as a zip code and the like of an owner was input could penetrate by being diffused in the image formation resin layer 12 of the retroreflective sheet for security so as to transfer the image thereto, thereby obtaining a print layer. Next, the releasable ink receptive layer 9 was released in a film state, thereby obtaining an image-added retroreflective sheet for security with the releasing member (see FIG. 16).

The releasing Mm (the releasing member) was released, and the thus obtained image-added retroreflective sheet for security was attached to a rear window of a vehicle from the outside thereof, and the color vehicle, the issue date, the public emblem, and the bar code and the like to which the individual information such as the zip code and the like was input could be identified visually clearly both in the day time and in the night time (the image-added retroreflective sheet for security was irradiated with light in the night time). Moreover, the mark in the image-added retroreflective sheet for security could be identified visually clearly both in the day time and in the night time. In addition, the bar code to which the individual information was input could be read by a bar code reader. Thereafter, the image-added retroreflective sheet for security was released, then exfoliation occurred between a printed part of letters of "OFFICIAL USE" and the metal layer, and the letters of "OFFICIAL USE" appeared on a surface of the glass of the rear window. In addition, the metal layer except the part of the letters of "OFFICIAL USE" was left on the thus released image-added retroreflective sheet for security, and thus it was possible to recognize that the image-added retroreflective sheet for security was released from the rear window, at one glance. Moreover, the information in the released image-added retroreflective sheet for security could not be tampered, and reuse of the released image-added retroreflective sheet for security was also impossible. Furthermore, the image-added retroreflective sheet for security was kept to be left in a state of being attached to a glass plate at 65° C. for 500 hours, but an edge of the image did not become blurred and sharpness of the image did not deteriorate.

Comparative Example 1

A retroreflective sheet for security with a releasing member was obtained in the same manner as Example 2, except for changing the content of the resin composition for the image formation resin layer 12 of Example 2 as described below.

The resin composition for the image formation resin layer 12 contained: about 100 parts of BURNOCK D6-439 (an alkyd resin produced by Dainippon Ink and Chemicals, Inc., solid content hydroxyl value of 140, nonvolatile content of 80%); about 82 parts of BURNOCK DN-980 (a polyisocyanate prepolymer produced by Dainippon Ink and Chemicals, Inc., nonvolatile content of 75%); about 1 part of TINUVIN 900; about 1 part of TINUVIN 292; and 40 parts of a polyester plasticizer D620 (produced by J-PLUS Co., Ltd., molecular weight of about 800) that was a high-molecular-weight plasticizer. A content of a low-molecular-weight compound with a molecular weight of about 1300 or less in the thus obtained image formation resin layer was about 22%.

A color vehicle, an issue date, a public emblem and a bar code and the like to which individual information such as a zip code was input were dyed by being diffused in the image formation resin layer 12 of the thus obtained retroreflective sheet for security with the releasing member so as to transfer the image thereto, in the same manner as Example 3, thereby obtaining a print layer. The releasing film (the releasing member) of the obtained image-added retroreflective sheet for security with the releasing member was released, and was attached to a rear window of the vehicle from an outside thereof, but the information could not be read by a bar code reader. This was thought to be because the sublimable dye was blurred at an edge of a bar of the bar code, and thus, sharpness of the bar deteriorated. In addition, the image-added retroreflective sheet for security was kept to be left at 65° C. for 200 hours after being attached to a glass plate, and the edge of the image became blurred and the sharpness of the image deteriorated.

Comparative Example 2

A retroreflective sheet for security with a releasing member was obtained in the same manner as Example 4, except omitting the step of forming the dye migration preventive resin layer 13 of Example 4.

A color vehicle, an issue date, a public emblem, and a bar code and the like to which individual information such as a zip code and the like was input were dyed by being diffused in the image formation resin layer 12 of the retroreflective sheet for security with the releasing member so as to transfer the image thereto, in the same manner as Example 5, thereby obtaining a print layer. The releasing film of the obtained image-added retroreflective sheet for security with the releasing member was released, and was attached to a rear window of the vehicle from the outside thereof, and the information could be read through the glass of the rear window by a bar code reader. Whereas, when the image-added retroreflective sheet for security was kept to be left at 65° C. for 200 hours after being attached to a glass plate, the edge of the image became blurred and the sharpness of the image deteriorated. In addition, the sublimable dye was blurred at the edge of a bar of the bar code, and sharpness of the bar accordingly deteriorated, and thus the information could not be read by the bar code reader.

INDUSTRIAL APPLICABILITY

The retroreflective sheet for security of the present invention has a function of showing information on a vehicle and the like by being attached to an outside of a window glass of the vehicle or the like, and can also be used for a purpose of preventing counterfeit of a number plate of the vehicle.

The invention claim is:
1. A retroreflective sheet for security, comprising:
a surface layer;
a binder layer;
high-refractive-index glass beads;
a print resin layer;
a focusing layer;

a metal layer; and a pressure-sensitive adhesive layer, in this order along a thickness direction of the retroreflective sheet for security, wherein the print resin layer is formed on a part of the binder layer opposite to a surface layer side, and when being observed from the surface layer side in the thickness direction of the retroreflective sheet for security, the print resin layer forms a mark, the high-refractive-index glass beads are disposed in the binder layer on which the print resin layer is not formed, and the high-refractive-index glass beads are not present between the print resin layer and the metal layer, a position for disposing the high-refractive-index glass beads does not coincide with a position of the print resin layer at all, when being observed from the surface layer side in the thickness direction of the retroreflective sheet for security, and the print resin layer is made of a composition containing a room temperature curing resin as a main component.

2. The retroreflective sheet for security according to claim 1, wherein the binder layer is made of a composition containing a thermosetting resin.

3. The retroreflective sheet for security according to claim 1, further comprising a self-destructive layer between the focusing layer and the metal layer.

4. The retroreflective sheet for security according to claim 3, wherein the self-destructive layer is made of a resin composition having low adhesion with the metal layer.

5. The retroreflective sheet for security according to claim 1, further comprising a self-destructive layer, wherein the pressure-sensitive adhesive layer is disposed between the metal layer and the self-destructive layer.

6. The retroreflective sheet for security according to claim 5, wherein the self-destructive layer is a film comprising a hologram or a diffraction grating, or a film obtained by subjecting a fragile film or a supporting film to a regular or irregular releasing treatment.

7. The retroreflective sheet for security according to claim 1, wherein the surface layer and the binder layer are made of the same resin composition.

8. The retroreflective sheet for security according to claim 1, which can be colored by allowing a sublimable dye to penetrate an inside of an image formation resin layer by heating, wherein the surface layer comprises:

a surface resin layer that has a weak affinity with the sublimable dye and allows the sublimable dye to penetrate;

the image formation resin layer having an affinity with the sublimable dye; and a dye migration preventive resin layer for preventing migration of the sublimable dye, in this order from a surface side of the surface layer.

9. The retroreflective sheet for security according to claim 8, wherein the dye migration preventive resin layer is a resin layer containing a vinyl resin with a glass transition temperature (Tg) of 70° C. or more and a SP value of 9.0 or more as a main component.

10. The retroreflective sheet for security according to claim 8, wherein a film thickness of the dye migration preventive resin layer ranges from 1 µto 100 µm inclusive.

11. The retroreflective sheet for security according to claim 8, wherein the dye migration preventive resin layer is a biaxially stretched film that is stretched by 10% or more in a winding direction and in a width direction respectively.

12. The retroreflective sheet for security according to claim 11, wherein a shrinkage ratio of the biaxially stretched film in the winding direction of the film after being heated at 150° C. for 30 minutes is 1.0% or less.

13. The retroreflective sheet for security according to claim 8, wherein the image formation resin layer is a resin layer containing a low-molecular-weight compound with a molecular weight of 1300 or less in an amount of 0% to 20 wt % inclusive.

14. An original sheet of a retroreflective sheet for security that is for the retroreflective sheet for security according to claim 1, comprising:

a surface layer;

a binder layer;

high-refractive-index glass beads;

a print resin layer;

a focusing layer; and a metal layer, in this order along a thickness direction of the original sheet of the retroreflective sheet for security, wherein the print resin layer is formed on a part of the binder layer opposite to a surface layer side, and when being observed from the surface layer side in the thickness direction of the original sheet of the retroreflective sheet for security, the print resin layer forms a mark, the high-refractive-index glass beads are disposed in the binder layer on which the print resin layer is not formed, and the high-refractive-index glass beads are not present between the print resin layer and the metal layer, a position for disposing the high-refractive-index glass beads does not coincide with a position of the print resin layer at all when being observed from the surface layer side in the thickness direction of the original sheet of the retroreflective sheet for security, and the print resin layer is made of a composition containing a room temperature curing resin as a main component.

15. A method for manufacturing the retroreflective sheet for security according to claim 1, comprising:

laminating the binder layer on the surface layer;

printing on the binder layer so as to form the print resin layer;

curing the print resin layer at room temperature;

heating the binder layer to a temperature at which the binder layer generates stickiness;

embedding the high-refractive-index glass beads in a part of the binder layer where the print resin layer is not formed, so as to dispose the high-refractive-index glass beads in the binder layer on which the print resin layer is not formed;

laminating the focusing layer on the binder layer, the print resin layer and the high-refractive-index glass beads;

forming the metal layer on the focusing layer; and forming the pressure-sensitive adhesive layer on the metal layer.

16. The method for manufacturing the retroreflective sheet for security according to claim 15, wherein the surface layer comprises:

a surface resin layer that has a weak affinity with a sublimable dye and allows the sublimable dye to penetrate;

an image formation resin layer having an affinity with the sublimable dye; and a dye migration preventive resin layer for preventing migration of the sublimable dye in this order from a surface side of the surface layer, the method comprising laminating the binder layer on the dye migration preventive resin layer.

17. An image-added retroreflective sheet for security, comprising:

a surface layer that comprises: a surface resin layer that has a weak affinity with a sublimable dye and allows the sublimable dye to penetrate;
a print layer that has an affinity with the sublimable dye and comprises an image formed in a thickness direction of an image formation resin layer by the sublimable dye; and
a dye migration preventive resin layer for preventing migration of the sublimable dye;
a binder layer;
high-refractive-index glass beads;
a print resin layer;
a focusing layer;
a metal layer; and
a pressure-sensitive adhesive layer, in this order along a thickness direction of the image-added retroreflective sheet for security,
wherein the print resin layer is formed on a part of the binder layer opposite to a surface layer side, and when being observed from the surface layer side in the thickness direction of the image-added retroreflective sheet for security, the print resin layer forms a mark,
the high-refractive-index glass beads are disposed in the binder layer on which the print resin layer is not formed, and the high-refractive-index glass beads are not present between the print resin layer and the metal layer,
a position for disposing the high-refractive-index glass beads does not coincide with a position of the print resin layer at all, when being observed from the surface resin layer side in the thickness direction of the image-added retroreflective sheet for security, and
the print resin layer is made of a composition containing a room temperature curing resin as a main component.

18. The image-added retroreflective sheet for security according to claim 17, further comprising a self-destructive layer between the focusing layer and the metal layer.

19. A method for manufacturing the image-added retroreflective sheet for security according to claim 17, comprising:
printing on a transfer paper by using an ink containing the sublimable dye;
contacting an image-formed surface of the transfer paper with a surface resin layer of a retroreflective sheet for security, the retroreflective sheet for security comprising:
a surface layer;
a binder layer;
high-refractive-index glass beads;
a print resin layer;
a focusing layer;
a metal layer; and
a pressure-sensitive adhesive layer, in this order along a thickness direction of the retroreflective sheet for security,
the surface layer, including:
the surface resin layer that has a weak affinity with the sublimable dye and allows the sublimable dye to penetrate,
an image formation resin layer having an affinity with the sublimable dye, and
a dye migration preventive resin layer for preventing migration of the sublimable dye, in this order from a surface side of the surface layer;
wherein the print resin layer is formed on a part of the binder layer opposite to a surface layer side, and when being observed from the surface layer side in the thickness direction of the retroreflective sheet for security, the print resin layer forms a mark,
the high-refractive-index glass beads are disposed in the binder layer on which the print resin layer is not formed, and the high-refractive-index glass beads are not present between the print resin layer and the metal layer,
a position for disposing the high-refractive-index glass beads does not coincide with a position of the print resin layer at all, when being observed from the surface layer side in the thickness direction of the retroreflective sheet for security,
the print resin layer is made of a composition containing a room temperature curing resin as a main component;
heat-treating subsequently so as to sublimate the sublimable dye, allow the sublimable dye to penetrate the surface resin layer of the retroreflective sheet and form an image in the image formation resin layer of the retroreflective sheet for obtaining the print layer of the image-added retroreflective sheet; and
removing the transfer paper.

20. A method for manufacturing the image-added retroreflective sheet for security according to claim 17, comprising:
forming, on a surface resin layer of a retroreflective sheet for security, the retroreflective sheet for security comprising:
a surface layer;
a binder layer;
high-refractive-index glass beads;
a print resin layer;
a focusing layer;
a metal layer; and
a pressure-sensitive adhesive layer, in this order along a thickness direction of the retroreflective sheet for security,
the surface layer, including:
the surface resin layer that has a weak affinity with the sublimable dye and allows the sublimable dye to penetrate,
an image formation resin layer having an affinity with the sublimable dye., and
a dye migration preventive resin layer for preventing migration of the sublimable dye,
in this order from a surface side of the surface layer;
wherein the print resin layer is formed on a part of the binder layer opposite to a surface layer side, and when being observed from the surface layer side in the thickness direction of the retroreflective sheet for security, the print resin layer forms a mark,
the high-refractive-index glass beads are disposed in the binder layer on which the print resin layer is not formed, and the high-refractive-index glass beads are not present between the print resin layer and the metal layer,
a position for disposing the high-refractive-index glass beads does not coincide with a position of the print resin layer at all, when being observed from the surface layer side in the thickness direction of the retroreflective sheet for security,
the print resin layer is made of a composition containing a room temperature curing resin as a main component,
a releasable ink receptive layer that can display by print, has absorption of the ink containing the sublimable dye on a surface that is not in contact with the surface resin layer of the retroreflective sheet, can be subjected to heat treatment for sublimating the sublimable dye and allowing the sublimable dye to penetrate the surface resin layer of the retroreflective sheet so as to form an image in the image formation resin layer of the retroreflective sheet, and can be released in a state of a film from the surface resin layer of the retroreflective sheet after the heat treatment;

printing on the releasable ink receptive layer by using the ink containing the sublimable dye;

heat-treating subsequently so as to sublimate the sublimable dye, allow the sublimable dye to penetrate the surface resin layer of the retroreflective sheet and form an image in the image formation resin layer of the retroreflective sheet for obtaining the print layer of the image-added retroreflective sheet; and releasing the releasable ink receptive layer.

* * * * *